(12) United States Patent
Higuchi et al.

(10) Patent No.: US 7,672,408 B2
(45) Date of Patent: Mar. 2, 2010

(54) SIGNAL SEPARATION DEVICE AND SIGNAL SEPARATION METHOD

(75) Inventors: Kenichi Higuchi, Yokohama (JP); Hiroyuki Kawai, Yokosuka (JP); Noriyuki Maeda, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 785 days.

(21) Appl. No.: 11/128,193

(22) Filed: May 13, 2005

(65) Prior Publication Data
US 2005/0259771 A1 Nov. 24, 2005

(30) Foreign Application Priority Data
May 13, 2004 (JP) .............................. 2004-144182

(51) Int. Cl.
*H04B 7/10* (2006.01)
(52) U.S. Cl. ........................ 375/347; 455/135; 455/303; 455/160.1; 702/190
(58) Field of Classification Search .................. 370/207; 375/147, 264, 340, 341, 347; 455/562.1; 703/2
See application file for complete search history.

(56) References Cited

U.S. PATENT DOCUMENTS

| | | | |
|---|---|---|---|
| 2003/0073464 A1* | 4/2003 | Giannakis et al. | ........... 455/562 |
| 2003/0076890 A1* | 4/2003 | Hochwald et al. | ........... 375/264 |
| 2004/0066866 A1* | 4/2004 | Tong et al. | .................. 375/347 |

FOREIGN PATENT DOCUMENTS

WO   WO 2005/076491 A1   8/2005

OTHER PUBLICATIONS

Albert M. Chan, et al., "A New Reduced-Complexity Sphere Decoder For Multiple Antenna Systems", IEEE, 2002, pp. 460-464.

Xiaodong Li, et al., "Reduced-Complexity Detection Algorithms for Systems Using Multi-Element Arrays", IEEE, XP001017249, 2000, pp. 1072-1076.

Hiroyuki Kawai, et al., "Complexity-Reduced Maximum Likelihood Detection Based on Replica Candidate Selection With QR Decomposition Using Pilot-Assisted Channel Estimation and Ranking for MIMO Multiplexing Using OFCDM", The Institute of Electronics, Information and Communication Engineers, XP 001247980, Mar. 2004, pp. 55-60.

(Continued)

*Primary Examiner*—David C Payne
*Assistant Examiner*—Adolf Dsouza
(74) *Attorney, Agent, or Firm*—Oblon, Spivak, McClelland, Maier & Neustadt, L.L.P.

(57) ABSTRACT

A signal separation device is disclosed that is able to reduce a number of calculations required when separating a received signal transmitted from transmission devices into the individual transmission signal. The signal separation device includes a signal point derivation unit that multiplies the received signal with respective elements of a unitary matrix, and derives at least one received-signal signal point on a signal constellation diagram; a definition unit that defines plural sections on the signal constellation diagram, each of the sections including a predetermined number of signal points; a detection unit that detects a received-signal section from the sections, the received-signal section including the received-signal signal point; a selection unit that selects signal points in the received-signal section as candidates of the received-signal signal point; and a determination unit that determines the transmission signals based on the selected signal points.

10 Claims, 18 Drawing Sheets

OTHER PUBLICATIONS

Kenichi Higuchi, et al., "Adaptive Selection of Surviving Symbol Replica Candidates Based on Maximum Reliability in QRM-MLD for OFCDM MIMO Multiplexing", IEEE Communications Society Globecom, XP 003012688, Nov. 29, 2004, pp. 2480-2486.

Kyeong Jin Kim, et al., "Joint Channel Estimation and Data Detection Algorithms for MIMO-OFDM Systems", Proceedings 36th Asilomar Conference on Signals, Systems and Computers, Nov. 2002, pp. 1857-1861.

* cited by examiner

1302

1302

| Full MLD | | | 65536 |
|---|---|---|---|
| QRM-MLD | RELATED ART | $S_m=16$ | 784 |
| | | $S_m=12$ | 592 |
| | | $S_m=8$ | 400 |
| | PRESENT INVENTION | $S_m=128$ | 400 |
| | | $S_m=61$ | 199 |
| | | $S_m=28$ | 100 |
| | | $S_m=16$ | 64 | ns
SIGNAL SEPARATION DEVICE AND SIGNAL SEPARATION METHOD

BACKGROUND OF THE INVENTION

1. Field of the Invention

The present invention relates to a wireless communication technique, in particularly, to a signal separation device and a signal separation method for separating plural signals, transmitted from transmission devices and received by a receiver, into individual transmission signals.

2. Description of the Related Art

In the wireless communication technical field, studies are being made to realize large capacity and high speed communication of the present generation and the next generation communication systems. For example, in addition to an existing SISO (Single Input Single Output) scheme, from the point of view of increasing the communication capacity, studies are being made on a SIMO (Single Input Multi Output) scheme, a MISO (Multi Input Single Output) scheme, furthermore, a MIMO (Multi Input Multi Output) scheme.

FIG. 1 is a diagram illustrating a communication system adopting the MIMO scheme, which includes a transmitter 102 and a receiver 104.

As illustrated in FIG. 1, in the MIMO scheme, signals from a number of transmitting antennae 106-1 through 106-N are transmitted simultaneously at the same carrier frequency. These signals are received by a number of reception antennae 108-1 through 108-N. Here, it is assumed that the number of the transmitting antennae is the same as the number of the reception antennae just for simplicity of description; certainly, the number of the transmitting antennae can be different from the number of the reception antennae.

In the receiver 104, the signals collectively received by the reception antennae 108-1 through 108-N are separated into those individuals signals transmitted from the transmitting antennae 106-1 through 106-N. The separated signals are sent to later-stage elements for demodulation.

There are several methods for the receiver 104 to separate the received signals. One is the so-called MLD (Maximum Likelihood Detection) method. In MLD, a squared Euclidian distance is calculated throughout all possible combinations of the signals transmitted from the plural transmitting antennae and the received signals, and the combination resulting in the minimum distance is selected.

By using MLD, although the collectively received signals can be reliably separated into individual transmitted signals, because deduction of the squared Euclidian distance requires a large number of calculations, signal separation with MLD requires high calculation capability.

For example, if four signals ($x1$, $x2$, $x3$, and $x4$) are transmitted from four transmitting antennae by using the 16 QAM modulation scheme, in this case, each of the four transmission signals is mapped into one of 16 signal points in a signal constellation diagram (a diagram illustrating distribution of signal points), the number (M) of all possible combinations of the transmission signals in the received is expressed as $P^N$, where, P indicates the number of signal points of one transmission signal, and N indicates the number the transmitting antennae. In this example, as mentioned above, P=16, and N=4, hence, $M=16^4=65536$, that is, there are as many as 65536 different combinations, and it is a very large number.

In order to calculate the squared Euclidian distance for all these combinations to determine a most-probable combination, very high calculation capability is required, and this makes it difficult to reduce the size of a mobile terminal. Further, because of the large number of calculations, electrical power consumption increases, and this also hinders reduction of the size of the mobile terminal.

Another method of separating the received signals is the so-called QRM-MLD, which involves corrections to MLD. In QRM-MLD, QR separation and M-algorithm are applied to MLD so as to decrease the number of computations required in calculation of the squared Euclidian distance.

For details of QRM-MLD, for example, reference can be made to "K. J. Kim, et al., "Joint channel estimation and data detection algorithms for MIMO-OFDM systems", Proceedings 36th Asilomar Conference on Signals, Systems and Computers, November 2002".

Considering the above example again, when using QRM-MLD, the number ($M_C$) of computations in calculation of the squared Euclidian distance is expressed as:

$$M_C = N_A + N_B * N_C * N_D,$$

Where, $N_A$ represents the number of signal point candidates, $N_B$ represents the number of newly added signal point candidates, $N_C$ represents the number of surviving signal point candidates at the previous stage, and $N_D$ represents the number of the transmitting antennae.

As $N_A=16$, $N_B=16$, $N_C=16$, and $N_D=3$, it is obtained that $M_C=16+16*16*3=748$.

Therefore, by using QRM-MLD, the large number of the calculations can be reduced greatly compared to MLD. However, considering a compact mobile terminal, this number of calculations is still too large.

SUMMARY OF THE INVENTION

It is a general object of the present invention to solve one or more problems of the related art.

A more specific object of the present invention is to provide a signal separation device and a signal separation method able to reduce the number of calculations required when separating a received signal including a plurality of transmission signals respectively transmitted from transmitters into the individual transmission signals.

According to a first aspect of the present invention, there is provided a signal separation device that receives a plurality of signals transmitted from a plurality of transmission devices and separates the received signals into the individual transmission signals. The signal separation device includes a signal point derivation unit that multiplies the received signals with respective elements of a unitary matrix, and derives at least one received-signal signal point on a signal point distribution diagram, different signals being related to different signal points at different positions on the signal point distribution diagram; the received-signal signal point being a signal point corresponding to one of the received signals; a definition unit that defines a plurality of sections on the signal point distribution diagram, each of the sections including a first predetermined number of signal points; a detection unit that detects a received-signal section from the sections, the received-signal section including the received-signal signal point; a selection unit that selects signal points in the received-signal section as candidates of the received-signal signal point; and a determination unit that determines the transmission signals based on the selected signal points.

Preferably, the definition unit further defines a plurality of sub-sections in the received-signal section, each of the sub-sections including a second predetermined number of signal points.

Further, a received-signal sub-section is detected from the plurality of sub-sections on the received-signal section, said received-signal sub-section including the received-signal signal point; and at least signal points included in the received-signal sub-section are selected as candidates of the received-signal signal point.

As an embodiment, the received-signal section is a quadrant of the signal point distribution diagram; and the received-signal sub-section is a quadrant of the signal point distribution diagram with an origin being located in the received-signal section.

Preferably, the signal separation device further includes a ranking unit that determines priority levels of plural signal points.

Preferably, the signal separation device further includes a calculation unit that calculates a quantity representing a Euclidian distance between each of the candidates of the received-signal signal point and the received-signal signal point. For example, the quantity representing the Euclidian distance includes a portion of a Euclidian distance related to another received-signal signal point deduced previously.

According to a second aspect of the present invention, there is provided a signal separation method of receiving a plurality of signals transmitted from a plurality of transmission devices and separating the received signals into the individual transmission signals. The signal separation method includes a derivation step of multiplying the received signals with respective elements of a unitary matrix, and deriving at least one received-signal signal point on a signal point distribution diagram, different signals being related to different signal points at different positions on the signal point distribution diagram; the received-signal signal point being a signal point corresponding to one of the received signals; a first section defining step of defining a plurality of sections on the signal point distribution diagram, each of the sections including a predetermined number of signal points; a first detection step of detecting a received-signal section from the plural sections, the received-signal section including the received-signal signal point; and a first selection step of selecting signal points in the received-signal section as candidates of the received-signal signal point.

Preferably, the signal separation method further includes a second section defining step of defining a plurality of sub-sections in the received-signal section, each of the sub-sections including another predetermined number of signal points; a second detection step of detecting a received-signal sub-section from the plurality of sub-sections, the received-signal sub-section including the received-signal signal point; and a second selection step of selecting at least signal points included in the received-signal sub-section as candidates of the received-signal signal point.

Preferably, the second section defining step, the second detection step, and the second selection step are repeatedly executed until the received-signal sub-section includes only one candidate of the received-signal signal point.

Preferably, the received-signal section is a quadrant of the signal point distribution diagram; and the received-signal sub-section is a quadrant of the signal point distribution diagram with an origin being located in the received-signal section. As an embodiment, the origin of the signal point distribution diagram is set at one of the signal points; the quadrant corresponding to the received-signal section is detected; the origin of the signal point distribution diagram is moved into the quadrant corresponding to the received-signal section; and the quadrant corresponding to the received-signal sub-section is detected. Preferably, the step of moving the origin of the signal point distribution diagram is moved into the quadrant corresponding to the received-signal section and the step of detecting the quadrant corresponding to the received-signal sub-section are repeatedly executed.

As an embodiment, the signal separation method further includes a step of determining priority levels of a plurality of signal points.

As an embodiment, the signal separation method further includes a step of calculating a quantity representing a Euclidian distance between each candidates of the received-signal signal point and the received-signal signal point. For example, the quantity representing the Euclidian distance includes a portion of a Euclidian distance related to another received-signal signal point deduced previously.

According to a third aspect of the present invention, there is provided a signal separation device that receives a plurality of signals transmitted from a plurality of transmission devices, multiplies the received signals with a unitary matrix, derives at least one received-signal signal point on a signal point distribution diagram, and determines the individual transmission signals. The signal separation device includes a ranking unit that determines a plurality of sequences of priority levels of a plurality of signal points, and assigns each of the sequences an accumulative metric; a selection unit that compares two or more of the accumulative metrics, selects a predetermined sequence of priority levels, and outputs a selection signal for designating signal points in accordance with the selected sequence of priority levels, the accumulative metric of the predetermined sequence of priority levels having a predetermined value; a calculation unit that calculates a quantity representing a Euclidian distance between the signal point designated by using the selection signal and the received-signal signal point; and an updating unit that updates the predetermined value of the accumulative metric of the predetermined sequence by adding the quantity representing the Euclidian distance to the predetermined value of the accumulative metric.

According to a fourth aspect of the present invention, there is provided a signal separation method used for receiving a plurality of signals transmitted from a plurality of transmission devices, multiplying the received signals with a unitary matrix, deriving at least one received-signal signal point on a signal point distribution diagram, and determining the individual transmission signals. The signal separation method include the steps of determining a plurality of sequences of priority levels of a plurality of signal points, and assigning each of the sequences an accumulative metric; comparing two or more of the accumulative metrics, selecting a predetermined sequence of priority levels, and outputting a selection signal for designating signal points in accordance with the selected sequence of priority levels, the accumulative metric of the predetermined sequence of priority levels having a predetermined value; calculating a quantity representing a Euclidian distance between the signal point designated by using the selection signal and the received-signal signal point; and updating the predetermined value of the accumulative metric of the predetermined sequence by adding the quantity representing the Euclidian distance to the predetermined value of the accumulative metric.

According to the present invention, compared to MLD, it is possible to reduce the number of calculations required when receiving plural signals transmitted from plural transmission devices and separating the received signals into the individual transmission signals.

These and other objects, features, and advantages of the present invention will become more apparent from the following detailed description of the preferred embodiments given with reference to the accompanying drawings.

DESCRIPTION OF THE PREFERRED EMBODIMENTS

Figure 1:
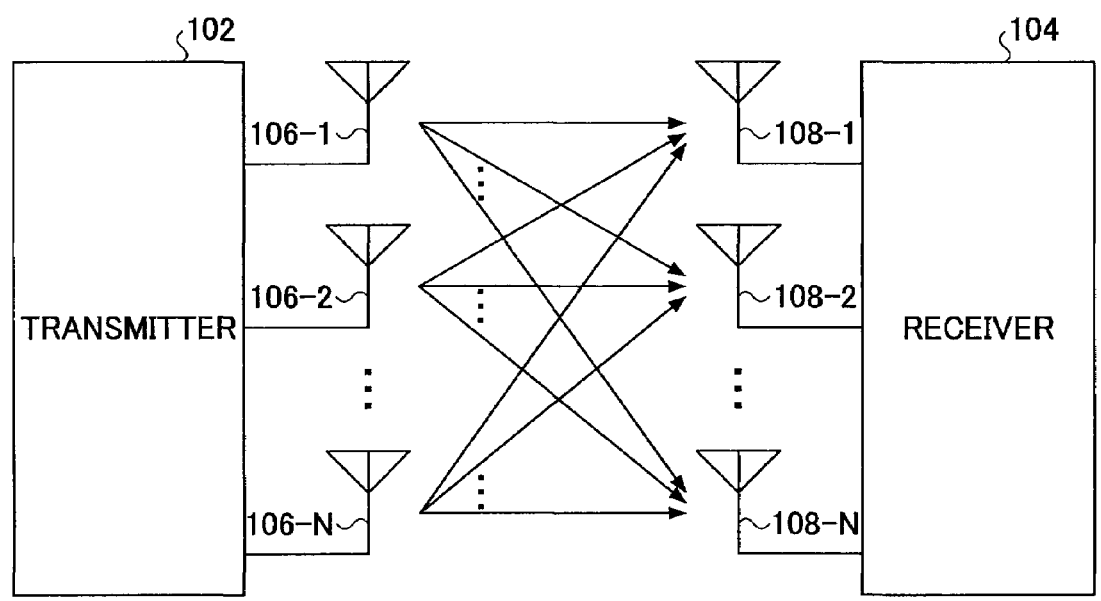
FIG. 1 is a diagram illustrating a communication system adopting a MIMO scheme, which includes a transmitter 102 and a receiver 104.

Below, preferred embodiments of the present invention are explained with reference to the accompanying drawings.

In an embodiment of a signal separation device according to the present invention, the signal separation device multiplies received signals with respective elements of a unitary matrix, and derives at least one signal point corresponding to one of the received signals (such a signal point is referred to as "received-signal signal point" below) on a signal constellation diagram (corresponding to the signal point distribution diagram in claims).

Further, the signal separation device defines plural sections on the signal constellation diagram each of which includes a predetermined number of signal points, detects a section from thus defined sections (such a section is referred to as "received-signal section" below), which includes the received-signal signal point, and selects signal points in the received-signal section as candidates of the received-signal signal point. Based on the selected signal point candidates, the signal separation device determines the individual transmission signals.

According to the present embodiment, by determining the received-signal section, which includes the received-signal signal point, it is possible to appropriately rank the candidates of the received-signal signal point without calculations of squared Euclidian distances. Hence, it is possible to efficiently derive surviving symbol candidates in QRM-MLD.

In another embodiment of the signal separation device according to the present invention, a received-signal section is a quadrant of the signal constellation diagram. The quadrant corresponding to the received-signal section is detected, and then coordinate transformation is performed to move the origin of the signal constellation diagram into the quadrant corresponding to the received-signal section.

According to the present embodiment, it is possible to determine the position relation between the received-signal signal point and other signal points on the signal constellation diagram.

When necessary, the origin-shift signal constellation diagram may be divided into four quadrants (sub-sections), each of which includes a predetermined number of signal points. By detecting a quadrant corresponding to the received-signal sub-section, which includes the received-signal signal point, it is possible to precisely determine the position of the received-signal signal point.

Preferably, the above mentioned coordinate transformation for moving the origin of the signal constellation diagram, section-definition, and received-signal quadrant detection can be executed repeatedly until the received-signal quadrant includes only one candidate of the received-signal signal point. Because a quadrant can be identified based only on polarities of components of the received signals, quadrant detection can be achieved easily compared to calculations of distances between signal points.

The above mentioned coordinate transformation, section-definition, and received-signal quadrant detection can be executed even when the received-signal quadrant includes only one candidate of the received-signal signal point. In this case, the area of the received-signal quadrant can be reduced according to required precision. Based on a known relative position relation between the small received-signal quadrant and the signal point candidates, it is possible to precisely rank the signal point candidates.

In another embodiment of the signal separation device according to the present invention, the signal separation device further includes a calculation unit that calculates a quantity representing a Euclidian distance between a candidate of the received-signal signal point and the received-signal signal point. Based on ranking of the signal point candidates, calculation of the squared Euclidian distances can be made over the signal points selected based on the ranking. In this way, it is possible to reduce the number of calculations while improving signal separation accuracy.

For example, the quantity representing the Euclidian distance may be an accumulative value including-contribution of a Euclidian distance related to another received-signal signal point deduced previously.

By performing signal separation with an accumulative value, due to a diversity effect related to multiple channels, signal separation precision is improvable.

In another embodiment of the signal separation device according to the present invention, the signal separation device determines plural sequences of priority levels of signal points, and assigns each of the sequences an accumulative metric. The signal separation device compares two or more of the accumulative metrics, selects a predetermined sequence of priority levels, and outputs a selection signal for designating signal points in accordance with the selected sequence of priority levels. For example, the predetermined sequence of priority levels may be identified by an accumulative metric having a predetermined value. In addition, the signal separation device calculates a quantity representing a Euclidian distance between the signal point designated by using the selection signal and the received-signal signal point, and adds the quantity representing the Euclidian distance to the predetermined value of the accumulative metric to update the predetermined value of the accumulative metric of the predetermined sequence.

Because the accumulative metric is updated successively, it is possible to select signal points, namely, surviving symbol candidates, from multiple signal point candidates in desired order. Hence, the calculation of the squared Euclidian distance is made only on the signal points selected based on the selection signal, but not on the signal points other than the surviving signal points. In this way, it is possible to greatly reduce the number of calculations of the squared Euclidian distance compared to the related art.

Below, detailed explanations are made of embodiments of the signal separation device and signal separation method of the present invention.

First Embodiment

First, a signal separation method using QRM-MLD which is the base of the present invention is described.

For simplicity of description, here it is assumed that four transmission signals $x=(x_1, x_2, x_3, x_4)^T$ are transmitted from four transmitting antennae by using the 16 QAM modulation scheme. Here, the superscript T stands for "transpose" of a matrix. It should be noted that the present invention is not limited to the numbers of the transmitting antennae, the receiving antennae, and the modulation scheme, but is applicable to various communication systems.

Figure 2:
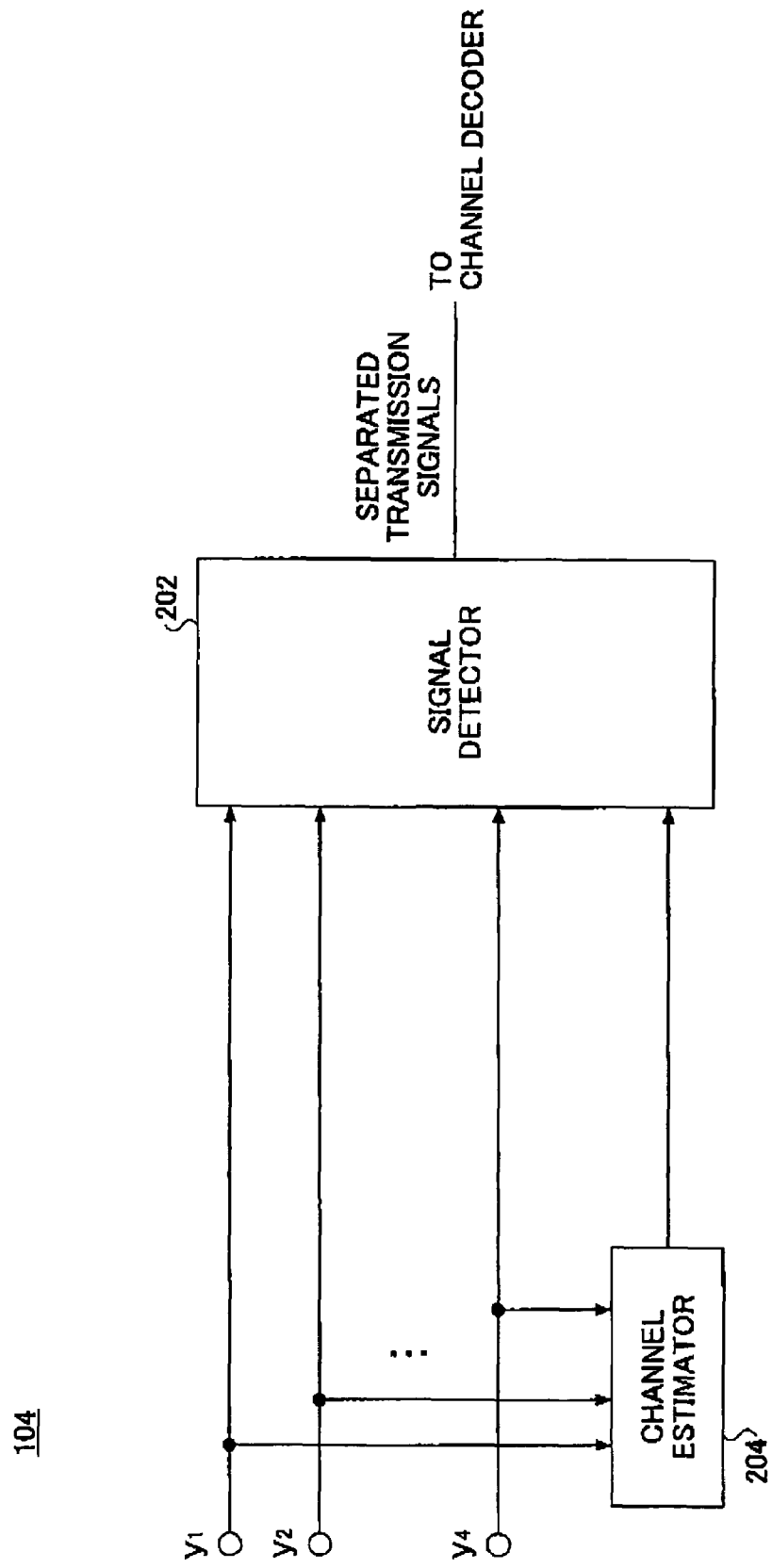
FIG. 2 is a block diagram schematically illustrating a configuration of a receiver 104 operating in the MIMO scheme.

FIG. 2 is a block diagram schematically illustrating a configuration of a receiver 104 operating in the MIMO scheme.

As illustrated in FIG. 2, the receiver 104 includes a signal detector 202 and a channel estimator 204.

The receiver 104 receives the four transmission signals by using four receiving antennae. The four received signals are represented by $y_1, y_2, y_3$, and $y_4$, respectively. These received signals are sent to the signal detector 202 and the channel estimator 204.

The signal detector 202 separates the collectively received signals $y=(y_1, y_2, y_3, y_4)^T$ into individual transmission signals. These separated signals are sent to later-stage elements for modulation.

In addition, the received signals $y=(y_1, y_2, y_3, y_4)^T$ are also sent to the channel estimator 204.

The channel estimator 204 performs channel estimation by calculating CIR (Channel Impulse Response) or channel estimation values based on a reception signal which includes a pilot signal known at both a transmitting end and a receiving end. A matrix H with channel estimation values $h_{nm}$ as elements is defined, and is referred to as "channel matrix H" below, where, $h_{nm}$ represents a channel estimation value between an m-th transmitting antenna and an n-th receiving antenna. In the present example, n=1, 2, 3, 4, and m=1, 2, 3, 4.

In QRM-MLD, first, the channel matrix H can be expressed as a product of a unitary matrix Q and an upper triangular matrix R, and from this relation, the unitary matrix Q and the upper triangular matrix R are determined.

Therefore, between the transmission signals x and the reception signals y, the following equation holds.

$$H=QR$$

If multiplying the above equation with a factor $Q^H$ from the left side, one has, $$Q^H y = Q^H Q R x = Q^{-1} Q R x = R x$$

Namely, $$\underbrace{\begin{bmatrix} z_1 \\ z_2 \\ z_3 \\ z_4 \end{bmatrix}}_{Q^H y} = \underbrace{\begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}}_{R} \underbrace{\begin{bmatrix} x_1 \\ x_2 \\ x_3 \\ x_4 \end{bmatrix}}_{x}$$

where, $z=(z_1, z_2, z_3, z_4)^T=Q^H y$.

Hence, one obtains $z_1 = r_{11}x_1 + r_{12}x_2 + r_{13}x_3 + r_{14}x_4$ $z_2 = r_{22}x_2 + r_{23}x_3 + r_{24}x_4$ $z_3 = r_{33}x_3 + r_{34}x_4$ $z_4 = r_{44}x_4$ The processing of finding the unitary matrix Q may be performed in the signal detector 202 or the channel estimator 204.

Figure 3:
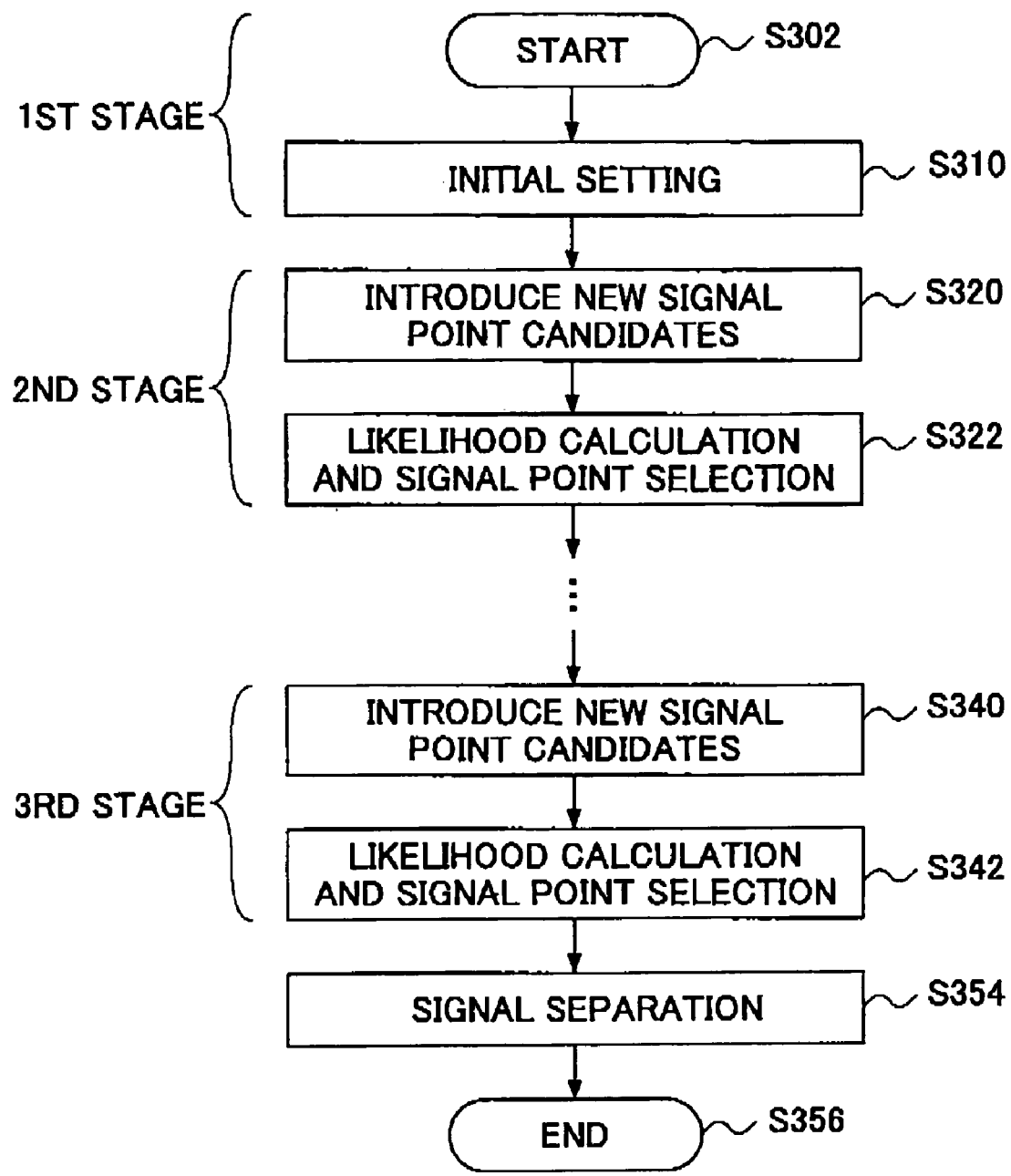
FIG. 3 is a flowchart of a signal separation method using QRM-MLD according to a first embodiment of the present invention.

FIG. 3 is a flowchart for explaining a signal separation method using QRM-MLD according to a first embodiment of the present invention.

In step S310, initial setting is made. For example, focusing on the equation related to $z_4$. Because the matrix element $r_{44}$ is known, it is clear that $z_4$ only depends on the fourth transmission signal $x_4$. Hence, in order to estimate the fourth transmission signal $x_4$, it is sufficient to inspect at most 16 signal point candidates.

Step S302 and step S310 form a first stage of the processing in FIG. 3.

In step S320, for example, focusing on the equation related to $z_3$, because the matrix elements $r_{33}$ and $r_{34}$ are known, and there are 16 signal point candidates for the fourth transmission signal $x_4$, and 16 signal point candidates for the third transmission signal $x_3$, 16 signal point candidates related to the third transmission signal $x_3$ are newly introduced. Therefore, there are 16*16=256 combinations of signal points.

In step S322, signal point likelihood is calculated, and likely combinations of signal points are appropriately selected from the 256 combinations.

In the related art, in QRM-MLD, the squared Euclidian distances are calculated throughout all 256 combinations of the signal points, and 16 combinations are selected in the order of small values of the squared Euclidian distance. In this way, the third transmission signal $x_3$ is estimated.

In contrast, in the present invention, as described in the following first through fifth embodiments, 16 likely signal point candidates can be obtained by 16 calculations of the squared Euclidian distance. The thus obtained 16 signal point candidates are also called "surviving symbol candidates", and are basis of the subsequent calculation.

Step S320 and step S322 form a second stage of the processing in FIG. 3. Processing in step S320 and step S322 is repeated for estimation of the second transmission signal $x_2$. For example, focusing on the equation related to $z_2$, in this case, the matrix elements $r_{22}$, $r_{23}$ and $r_{24}$ are known, 16 combinations of the third transmission signal $x_3$ and the fourth transmission signal $x_4$ are obtained in step S322, and there are 16 signal point candidates for the second transmission signal $x_2$. Thus, 16 signal point candidates related to the second transmission signal $x_2$ are newly introduced. Therefore, also in this case, there are 16*16=256 combinations of signal points. Then, in the same step S322, signal point likelihood is calculated, and 16 likely combinations of signal points are appropriately selected from the 256 combinations. In this way, the second transmission signal $x_2$ is estimated.

In step S340, for example, focusing on the equation related to $z_1$, in this case, the matrix elements $r_{11}$, $r_{12}$, $r_{13}$ and $r_{14}$ are known, 16 combinations of the second transmission signal $x_2$, the third transmission signal $x_3$, and the fourth transmission signal $x_4$ are obtained already, and there are 16 signal point candidates for the first transmission signal $x_1$. Thus, 16 signal point candidates related to the first transmission signal $x_1$ are newly introduced. Therefore, also in this case, there are 16*16=256 combinations of signal points.

In step S342, signal point likelihood is calculated, and 16 likely combinations of signal points are appropriately selected from the 256 combinations. In this way, the first transmission signal $x_1$ is estimated.

Step S340 and step S342 form a third stage of the processing in FIG. 3.

In step S354, based on calculated likelihood of signal points, the received signals $y=(y_1, y_2, y_3, y_4)^T$ are separated into individual transmission signals $x=(x_1, x_2, x_3, x_4)^T$, and the processing of QRM-MLD is finished.

As described above, by executing operations including steps corresponding to the numbers of the transmitting antennae and the receiving antennae (here, they are four), the received signals can be separated into individual transmission signals.

It should be noted that although the numbers of the selected signal point candidates of different transmission signals are set to be the same (16) in the above example, the numbers of the selected signal point candidates of different transmission signals can be set different.

Below, methods of selecting signal points used in step S322 and S342 are explained.

Figure 4:
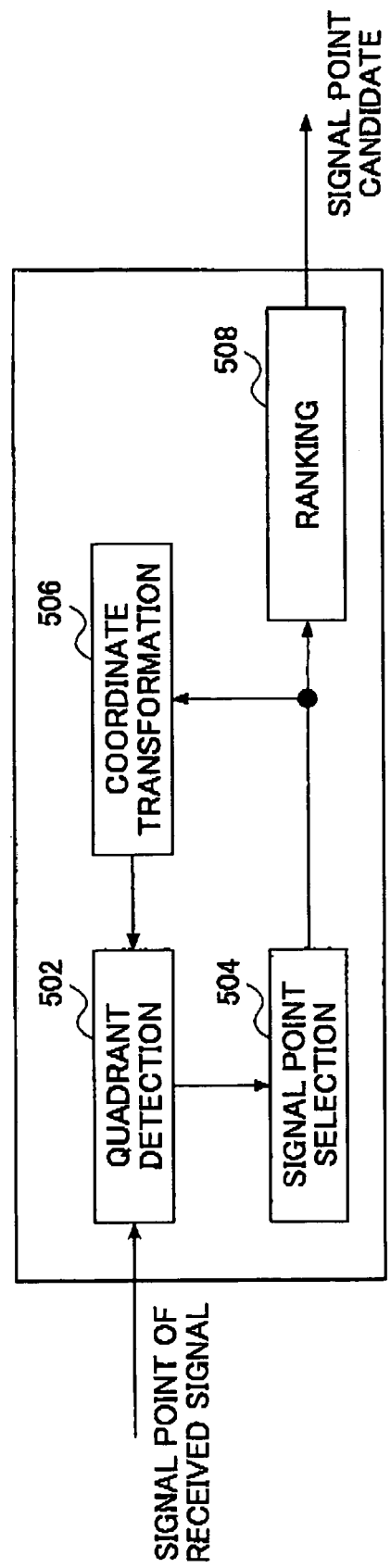
FIG. 4 is a block diagram illustrating a functional configuration of a principle portion of a signal separation device according to the first embodiment.

FIG. 4 is a block diagram illustrating a functional configuration of a principle portion of a signal separation device according to the present embodiment.

The portion of the signal separation device according to the present embodiment as illustrated in FIG. 4 includes a quadrant detection unit 502, a signal point selection unit 504, a coordinate transformation unit 506, and a ranking unit 508.

The quadrant detection unit 502 detects in which quadrant the received-signal signal points are located on the signal constellation diagram. For example, this detection can be achieved by discriminating signs of the horizontal component and the vertical component of a signal point.

The signal point selection unit 504 selects signal points in the detected quadrant, and outputs information for identifying the selected signal points.

The coordinate transformation unit 506 moves the origin of the signal constellation diagram to other places.

The ranking unit 508 determines likelihood of each signal point based on results of the quadrant detection operation and the coordinate transformation operation, and assigns each of the signal points under consideration a number in order of the obtained likelihood to rank the signal points.

Figure 5:
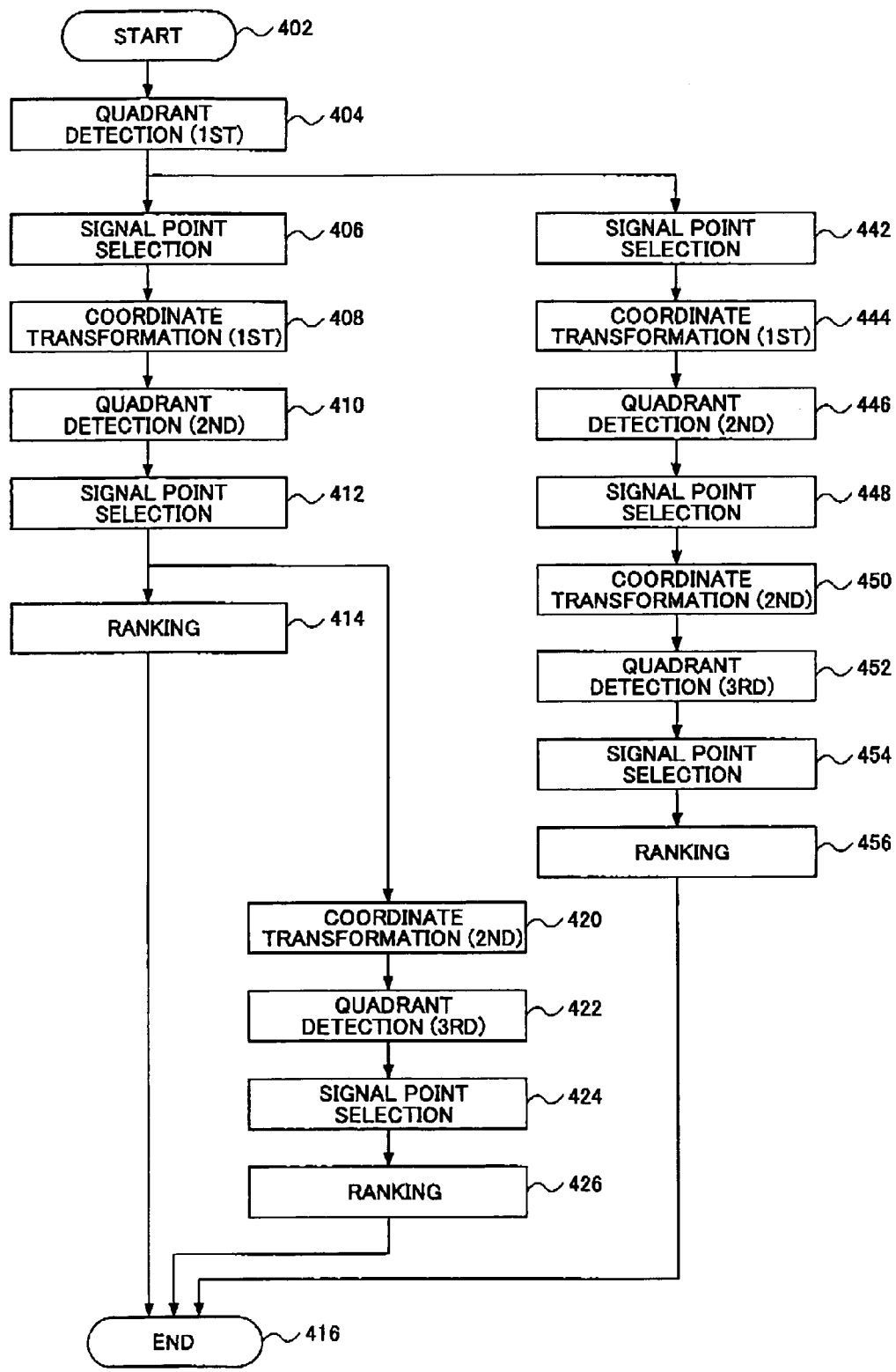
FIG. 5 is a flowchart illustrating the operations of signal point selection according to the first embodiment.

FIG. 5 is a flowchart of the operations of signal point selection according to the present embodiment. In the following description of FIG. 5, processing in step S322 in FIG. 3 is used as an example. Of course, the same operations are also executed in step S342 in FIG. 3.

Figure 6A:
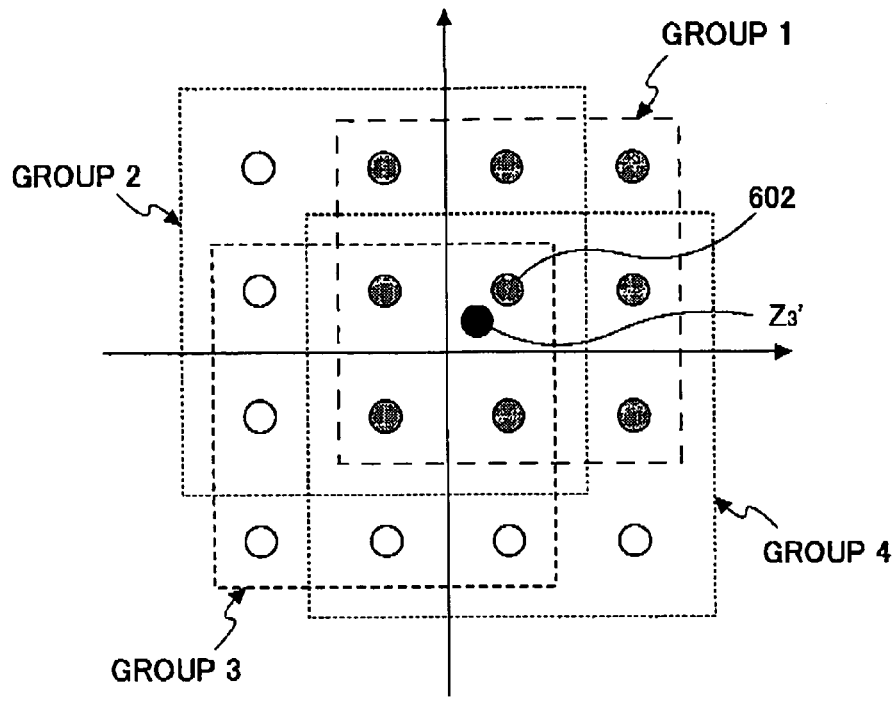
FIG. 6A presents a signal constellation diagram showing a signal point distribution in the first embodiment.

FIG. 6A presents a signal constellation diagram showing a signal point distribution in the present embodiment.

Figure 16:
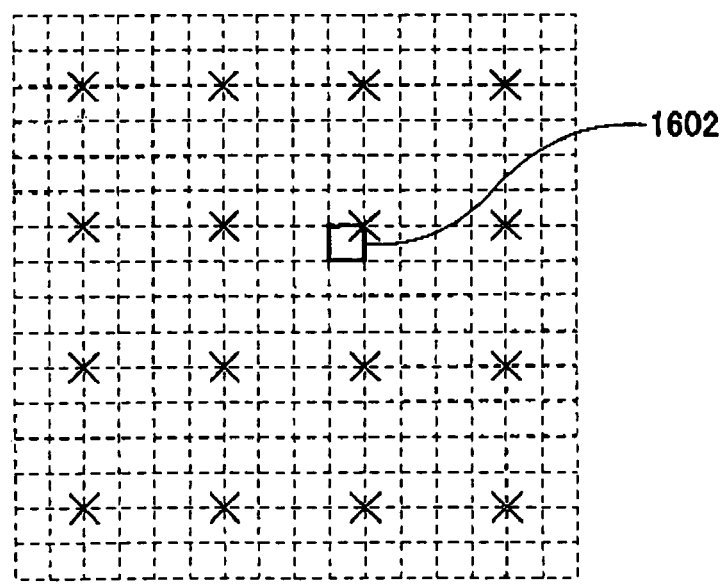
FIG. 16 presents a signal constellation diagram divided into small regions in the fifth embodiment of the present invention.

In the signal constellation diagram in FIG. 6A, 16 open circles represent the newly introduced signal point candidates related to the third transmission signal $x_3$ in step S322 in FIG. 3. In addition, in FIG. 6A, the solid circle represents the received-signal signal point represented by $z_3'=r_{33}^{-1}(z_3-r_{34}x_4)$. The quantity $z_3'$ equals the difference between a signal obtained by multiplying the received signal y with a unitary matrix $Q^H$ and a replica of a transmission signal determined in the preceding stage. The quantity $z_3'$ corresponds to $x_3$.

As described above, because there are 16 possible values of $x_4$, there are also 16 possible received-signal signal points $z_3'$. The solid circle in FIG. 6A corresponds to one received-signal signal point $z_3'$ derived from one of 16 possible values of $x_4$. For other values of $x_4$, the operations are the same.

Referring to FIG. 5, in step S404, it is detected in which quadrant the received-signal signal point $z_3'$ is located on the signal constellation diagram. As shown in FIG. 6A, the received-signal signal point $z_3'$ is in the first quadrant of the signal constellation diagram.

In step S406, a group of signal points on the signal constellation diagram is selected, which covers at least the signal points in the quadrant including the received-signal signal point $z_3'$, and the number of the signal points in this group is less than the number of the total signal points (it is 16) on the signal constellation diagram.

In this example, as shown in FIG. 6A, the first quadrant includes four signal points, group 1 through group 4 are defined on the signal constellation diagram, and the group 1 is selected. The selected signal points, that is, the signal points in the selected group 1, are indicated as grey circles. The numbers assigned to the respective groups are related to the quadrants (for example, the group 1 is related to the first quadrant). Each of the group 1 through group 4 includes nine signal points except for the received-signal signal point $z_3'$. As described below, the number of signal points in each group is not limited to nine. For example, one group may cover the four signal points in one quadrant only. However, from the point of view of improving signal separation precision, it is preferable that the groups be defined across two or more quadrants.

In step S408, coordinate transformation of the signal constellation diagram is performed so that the origin of the signal constellation diagram is moved to the center of the group 1 (specifically, the center of the nine signal points in the group 1).

Figure 6B:
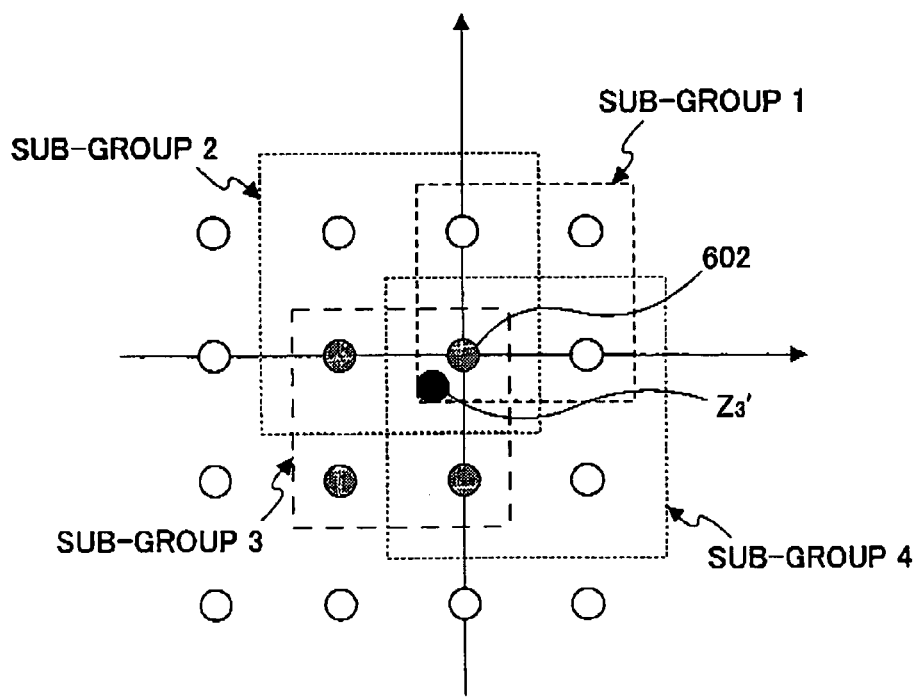
FIG. 6B shows the signal constellation diagram after coordinate transformation to move the origin of the signal constellation diagram.

FIG. 6B presents a signal constellation diagram showing a signal point distribution in the present embodiment.

FIG. 6B shows the signal constellation diagram after the coordinate transformation to move the origin of the signal constellation diagram to the signal point 602.

In step S410, it is detected in which quadrant the received-signal signal point $z_3'$ is located on the origin-moved signal constellation diagram. As shown in FIG. 6B, the received-signal signal point $z_3'$ is in the third quadrant of the new signal constellation diagram.

In step S412, among the nine signal points in the group 1, a sub-group is selected which covers at least the signal points in the quadrant of the new signal constellation diagram including the received-signal signal point $z_3'$. The signal points in the selected sub-group are indicated as grey circles.

As shown in FIG. 6B, sub-group 1 through sub-group 4 are defined on the new signal constellation diagram, and the sub-group 3 is selected. The numbers assigned to the respective sub-groups are related to the quadrants of the new signal constellation diagram, for example, the sub-group 1 is related to the first quadrant. Each of the sub-group 1 through sub-group 4 includes four signal points except for the received-signal signal point $z_3'$.

In step S414, based on results of the quadrant detection operations in step S404 and step S410, corresponding likelihood values are assigned to the 16 signal point candidates. Specifically, numbers are assigned to the signal point candidates in order of high likelihood level. This is the so-called "ranking" operation.

In the present example, because the received-signal signal point $z_3'$ is in the first quadrant in FIG. 6A, and in the third quadrant in FIG. 6B, it is found that the signal point 602 is the closest to the received-signal signal point $z_3'$. Hence, the signal point 602 is assigned a likelihood value "1". Likelihood values "2", "3" are assigned to signal points relatively close to the signal point 602 in the sub-group 3. When two or more signal points are at the same distance from the signal point 602, it is preferable that the rule of assigning the likelihood values be decided in advance. Likelihood value "4" is assigned to a signal point the farthest from the signal point 602 in the sub-group 3. In other words, likelihood values are assigned to signal point candidates in a sub-group or a group depending on the relative relation between the signal point candidates.

Figure 7:
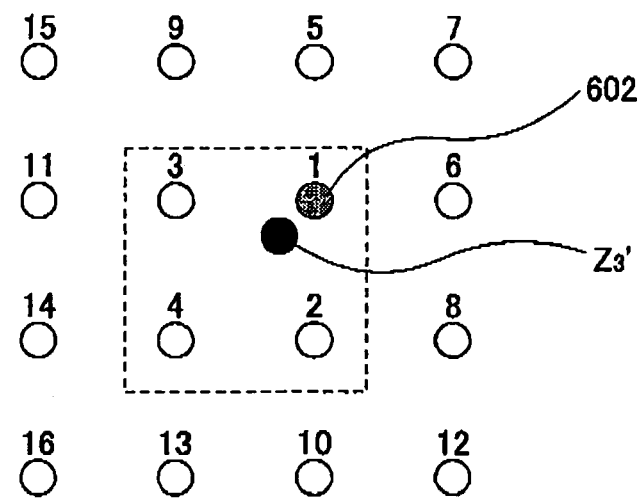
FIG. 7 shows the signal constellation diagram after the ranking operation.

FIG. 7 shows the signal constellation diagram after the ranking operation for all 16 signal points in the group 1, that is, corresponding likelihood values are assigned to all 16 signal points.

As described above, there are 16 possible received-signal signal points $z_3'$, and following the above procedure, likelihood values are obtained for the signal points related to one of 16 possible received-signal signal points $z_3'$, after which the processing is finished. As a result, priority levels (here, they are rankings based on likelihood values) are decided for plural signal points. These priority levels are used below for signal separation. For signal points related to another received-signal signal point $z_3'$, the likelihood values thereof can be obtained in the same way. For each of the received-signal signal points $z_3'$, the likelihood values of the signal points concerned can be calculated, and based on these likelihood values, 16 likely candidates of combinations of the third transmission signal $x_3$ and the fourth transmission signal $x_4$ are selected from all possible combinations of the third transmission signal $x_3$ and the fourth transmission signal $x_4$. For example, for simplicity of finding the likely candidates, the 16 signal points each of a likelihood value of 1 can be selected. In this case, the operations of assigning likelihood values 2 or higher in step 414 can be omitted. From the point of view of high estimation precision, as described below, one or more candidates of the third transmission signal $x_3$ can be selected for one candidate of the fourth transmission signal $x_4$.

Second Embodiment

In the present embodiment, another example of signal point selection is described still with reference to FIG. 5.

In the present embodiment, step S404 through step S412 in FIG. 5 are executed as in the previous embodiment; however, the procedure is different from that described above after step S412.

Below, it is assumed that it is detected that the received-signal signal points $z_3'$ is in the sub-group 3, as shown in FIG. 6B.

As illustrated in FIG. 5, in step S420, coordinate transformation of the signal constellation diagram is performed so that the origin of the signal constellation diagram is moved to the center of the sub-group 3.

Figure 8:
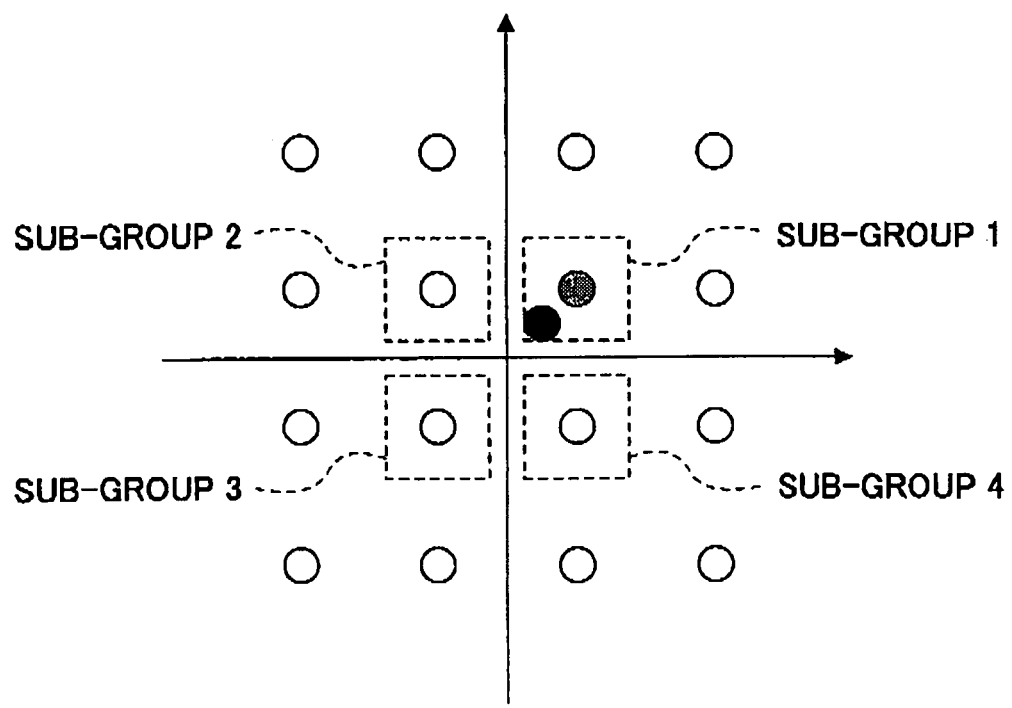
FIG. 8 presents a signal constellation diagram after coordinate transformation to move the origin of the signal constellation diagram in a second embodiment of the present invention.

FIG. 8 presents a signal constellation diagram after the coordinate transformation to move the origin of the signal constellation diagram to the center of the sub-group 3.

It should be noted that the new origin is not in agreement with any signal point.

After the coordinate transformation, there appear four new sub-groups, corresponding to four quadrants of the new signal constellation diagram, and each of the new sub-groups covers one signal point.

In FIG. 5, in step S422, it is detected in which quadrant the received-signal signal point $z_3'$ is located on the new signal constellation diagram obtained in step S420. As shown in FIG. 8, the received-signal signal point $z_3'$ is in the first quadrant of the new signal constellation diagram.

In step S424, a sub-group of signal points on the new signal constellation diagram is selected, which covers at least the signal points in the quadrant including the received-signal signal point $z_3'$. As a result, the sub-group 1 is selected, which includes the received-signal signal point $z_3'$, and another signal point. Hence, it is found that the signal point included in the sub-group 1 is the signal point closest to the received-signal signal point $z_3'$.

In step S426, the same as the operations in step S414, likelihood values are assigned to the 16 signal point candidates (indicated by open circles), respectively. The ranking results are the same as that shown in FIG. 7.

Third Embodiment

Figure 9:
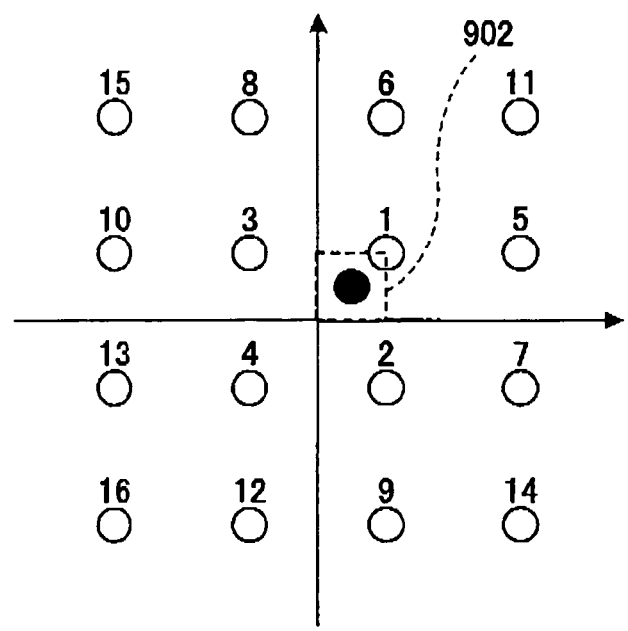
FIG. 9 presents a signal constellation diagram after ranking operation in a third embodiment of the present invention.

In the present embodiment, from the facts that the received-signal signal point $z_3'$ is in the sub-group 1 in FIG. 8, in the sub-group 3 in FIG. 6B, and in the group 1 in FIG. 6A, it can be found that the received-signal signal point $z_3'$ is in a small region 902 as shown in FIG. 9.

FIG. 9 presents a signal constellation diagram after the ranking operation in the present embodiment.

Figure 10:
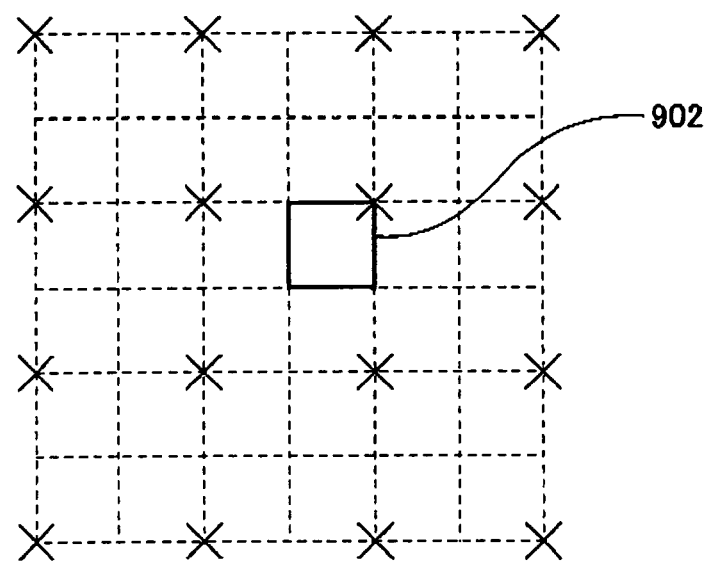
FIG. 10 presents a signal constellation diagram divided into small regions in the third embodiment of the present invention.

FIG. 10 presents a signal constellation diagram divided into small regions.

In FIG. 10, the region 902 corresponds to one division when the signal constellation diagram is divided into 6×6 divisions, as shown in FIG. 10.

Knowing that the received-signal signal point $z_3'$ is in the region 902, it is possible to appropriately set likelihood values of the 16 signal point candidates. The results are shown in FIG. 9.

According to the present embodiment, it is not necessary to use a signal point different from the received-signal signal point $z_3'$, such as the signal point 602, as a reference when setting the likelihood values. With small areas, like the small region 902, as a reference, since the small region 902 delimits the received-signal signal point $z_3'$ more accurately, it is possible to assign the likelihood values and to rank the signal points more accurately.

Fourth Embodiment

In the present embodiment, another example of signal point selection is described still with reference to FIG. 5.

Figure 11:
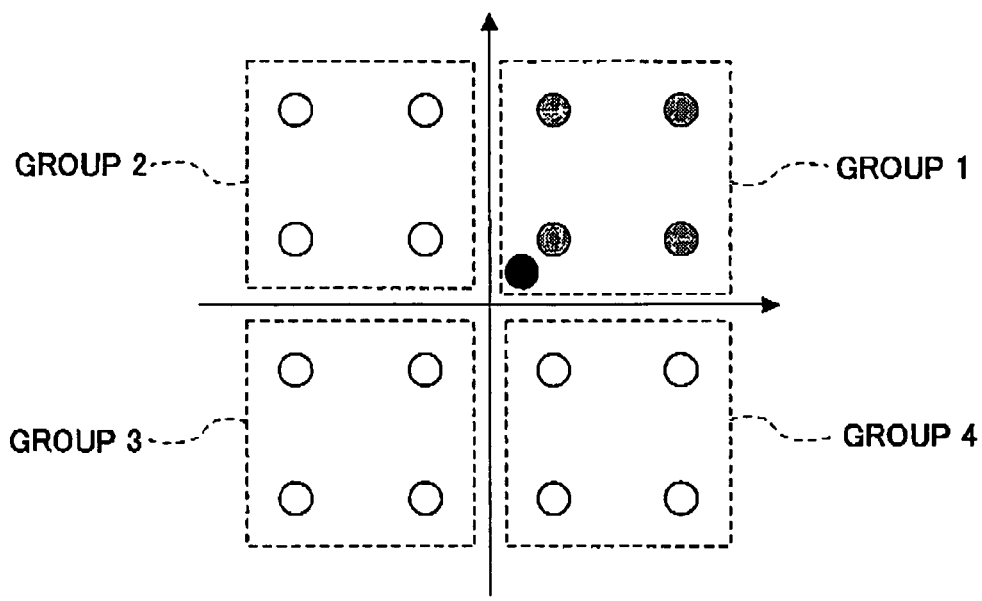
FIG. 11 presents a signal constellation diagram in a fourth embodiment of the present invention.

FIG. 11 presents a signal constellation diagram showing a signal point distribution in the present embodiment.

In the present embodiment, step S404 in FIG. 5 is executed as in the first embodiment, but the procedure after step S404 is different from the first embodiment.

In step S404, it is detected that the received-signal signal points $z_3'$ is in the group 1, as shown in FIG. 11.

In step S442, a group of signal points on the signal constellation diagram is selected, which covers at least the signal points in the quadrant including the received-signal signal point $z_3'$, and the number of the signal points in this group is less than the number of the total signal points (it is 16) on the signal constellation diagram.

As shown in FIG. 6A, group 1 through group 4 are defined on the signal constellation diagram, and the group 1 is selected. Different from the first embodiment, each of the group 1 through group 4 includes four signal points except for the received-signal signal point $z_3'$. The selected signal points, that is, the signal points in the selected group 1, are indicated as gray circles.

As described above, the number of signal points in each group or sub-group is not limited to nine or four, but can be of various values.

In the example in the first embodiment, 16 signal points are classified into four groups each including nine signal points, and after each quadrant detection operation, the number of signal points probably including the received-signal signal point $z_3'$ is reduced to one-fourth of the preceding number of signal points. However, other methods of classification may also be used. For example, the 16 signal points may also be classified into nine groups each including four signal points, and after each quadrant detection operation, the number of signal points probably including the received-signal signal point $z_3'$ is reduced to one-ninth of the preceding number of signal points.

Generally speaking, assuming there is a section including $m^2$ signal points (m is an integer greater than or equal to 2), and it is desired to divide the section so as to classify the $m^2$ signal points into plural groups, if each of the groups includes $n^2$ signal points (n is an integer, and satisfies m>n>1), the maximum number of groups is $(m-n+1)^2$. Therefore, after each quadrant detection operation, the number of signal points probably including the received-signal signal point $z_3'$ is reduced to $1/(m-n+1)^2$ of the preceding number of signal points.

In step S444, coordinate transformation of the signal constellation diagram is performed so that the origin of the signal constellation diagram is moved to the center of the group 1.

Figure 12:
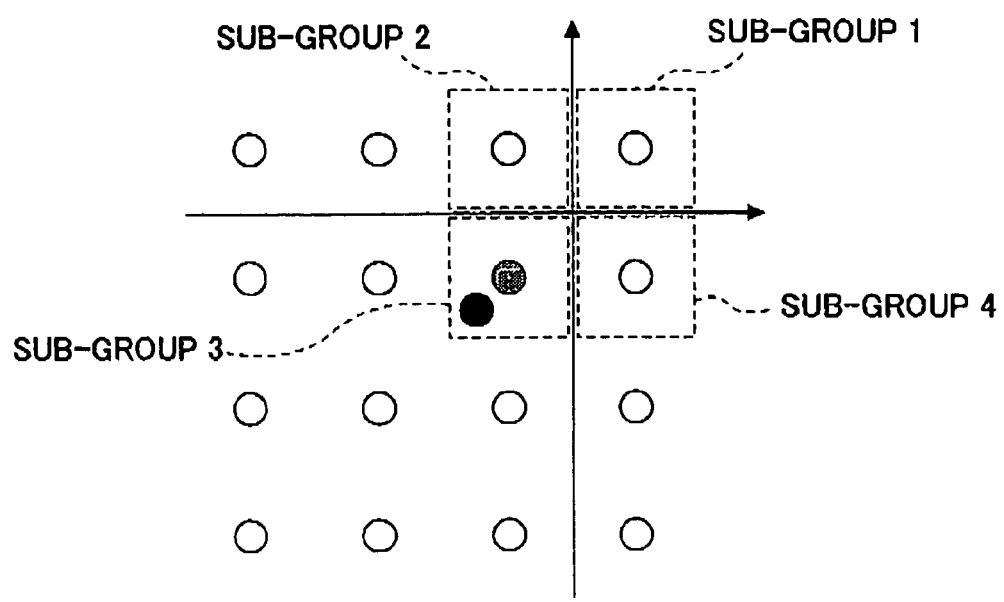
FIG. 12 presents the signal constellation diagram after coordinate transformation to move the origin of the signal constellation diagram in the fourth embodiment of the present invention.

FIG. 12 presents the signal constellation diagram after the coordinate transformation to move the origin of the signal constellation diagram to the center of the group 1.

In step S446, it is detected in which quadrant of the new signal constellation diagram the received-signal signal point $z_3'$ is located among the signal points in group 1. As shown in FIG. 12, the received-signal signal point $z_3'$ is in the third quadrant of the new signal constellation diagram.

In step S448, among the four signal points in the group 1, a sub-group is selected, which covers at least the signal points in the quadrant of the new signal constellation diagram including the received-signal signal point $z_3'$.

As shown in FIG. 12, sub-group 1 through sub-group 4 are defined on the new signal constellation diagram, and the sub-group 3 is selected. Each of the sub-group 1 through sub-group 4 includes one signal point except for the received-signal signal point $z_3'$.

In step S450, coordinate transformation of the signal constellation diagram in FIG. 12 is performed so that the origin of the signal constellation diagram in FIG. 12 is moved to the center of the sub-group 3.

Figure 13:
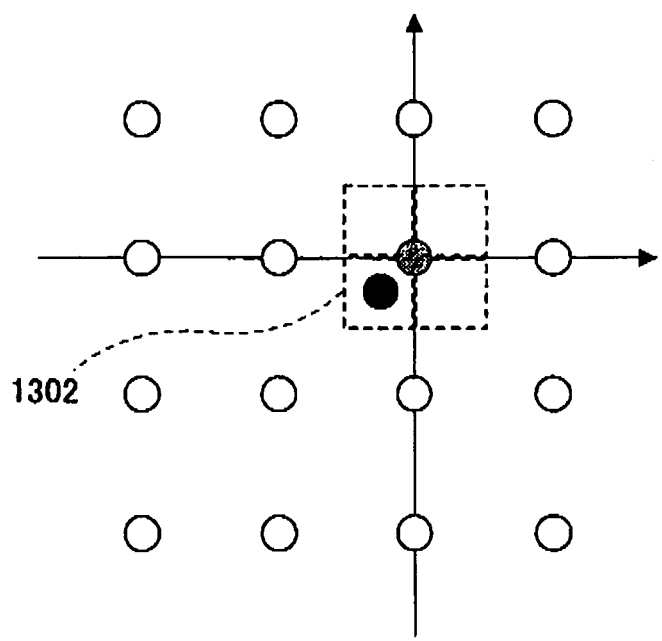
FIG. 13 presents a signal constellation diagram after coordinate transformation to move the origin of the signal constellation diagram in the fourth embodiment of the present invention.

FIG. 13 presents a signal constellation diagram after the coordinate transformation to move the origin of the signal constellation diagram to the center of the sub-group 3.

After the coordinate transformation, there appear four quadrants of the new signal constellation diagram.

In step S452, it is detected in which quadrant the received-signal signal point $z_3'$ is located on the new signal constellation diagram obtained in step S450. As shown in FIG. 13, the received-signal signal point $z_3'$ is in the third quadrant of the new signal constellation diagram.

In step S454, a small region 1302 corresponding to the third quadrant of the new signal constellation diagram in FIG. 13 is selected. As described above, the origin of the new signal constellation diagram in FIG. 13 is at the center (here, a signal point) of the sub-group 3. The small region 1302 includes the received-signal signal point $z_3'$.

Figure 14:
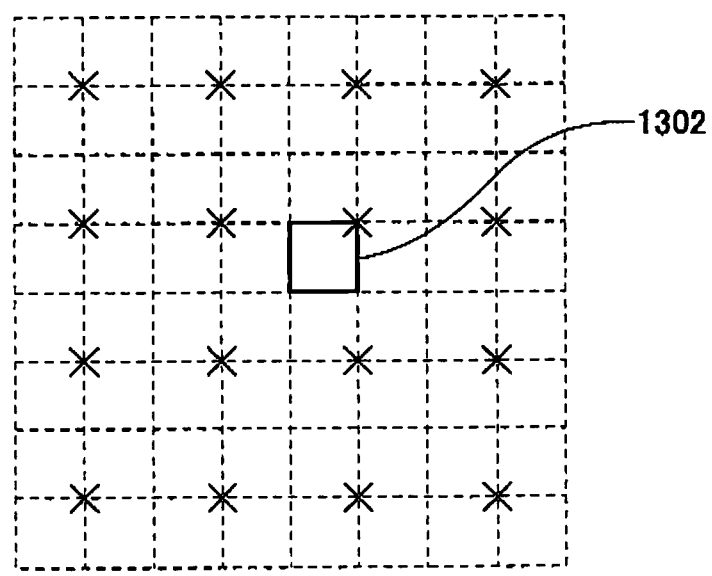
FIG. 14 presents a signal constellation diagram divided into small regions in the fourth embodiment of the present invention.

FIG. 14 presents a signal constellation diagram divided into small regions.

As shown in FIG. 14, the small region 1302 corresponds to one division when the signal constellation diagram is divided into 8×8 divisions.

In step S456, the same as the operations in step S426 in the third embodiment, based on the fact that the received-signal signal point $z_3'$ is included in the small region 1302, likelihood values are assigned to the relevant signal point candidates to rank these signal point candidates. The ranking results are the same as that shown in FIG. 9.

According to the present embodiment, because likelihood values are assigned with small areas, like the small region 1302, as a reference, and the small region 1302 delimits the received-signal signal point $z_3'$ more accurately, it is possible to assign the likelihood values and to rank the signal points more accurately.

Fifth Embodiment

After step S454 in FIG. 5, coordinate transformation of the signal constellation diagram may be performed again to move the origin of the signal constellation diagram to the center of the small region 1302.

Figure 15:
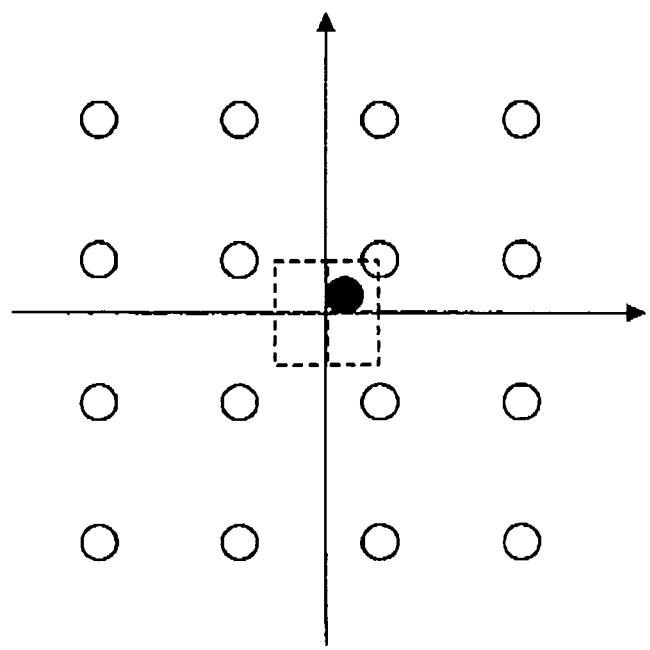
FIG. 15 presents the signal constellation diagram after coordinate transformation to move the origin of the signal constellation diagram in a fifth embodiment of the present invention.

FIG. 15 presents the signal constellation diagram after the coordinate transformation to move the origin of the signal constellation diagram to the center of the small region 1302.

Then, it is detected in which quadrant the received-signal signal point $z_3'$ is located on the new signal constellation diagram. As shown in FIG. 15, the received-signal signal point $z_3'$ is in the first quadrant of the new signal constellation diagram.

From the fact that the received-signal signal point $z_3'$ is in the first quadrant of the new signal constellation diagram in FIG. 15, and is in the small region 1302 in FIG. 13, it can be found that the received-signal signal point $z_3'$ is in an even smaller region 1602 as shown in FIG. 16.

FIG. 16 presents a signal constellation diagram divided into small regions.

Then, from the fact that the received-signal signal point $z_3'$ is in the small region 1602, it is possible to appropriately set likelihood values of relevant signal point candidates. The results are shown in FIG. 17.

Figure 17:
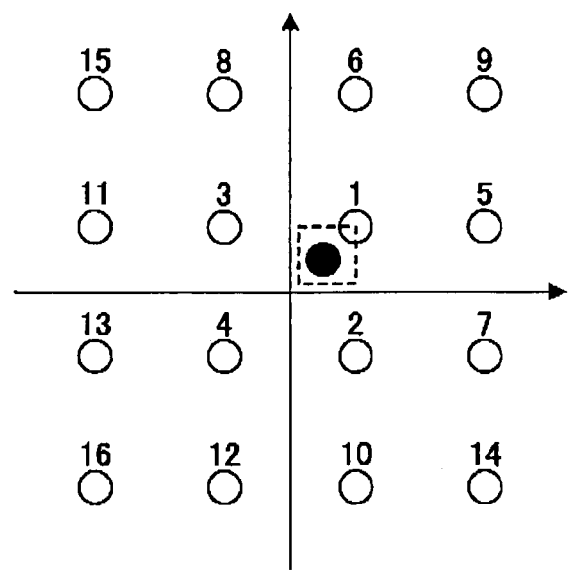
FIG. 17 presents a signal constellation diagram after ranking in the fifth embodiment of the present invention.

FIG. 17 presents a signal constellation diagram after the ranking operation in the present embodiment.

According to the present embodiment, because likelihood values are assigned with small areas, like the small region 1602, as a reference, and the small region 1602 delimits the received-signal signal point $z_3'$ much more accurately, it is possible to assign the likelihood values and to rank the signal points more accurately.

As described in the above embodiments, by executing additional operations of quadrant detection and coordinate transformation, the size of the small regions can be reduced. Consequently, as shown in the above embodiments, the signal constellation diagram can be divided into (6×6), (8×8), (16× 16) small regions, further, into (36×36) small regions as shown in FIG. 18, or into more small regions.

Figure 18:
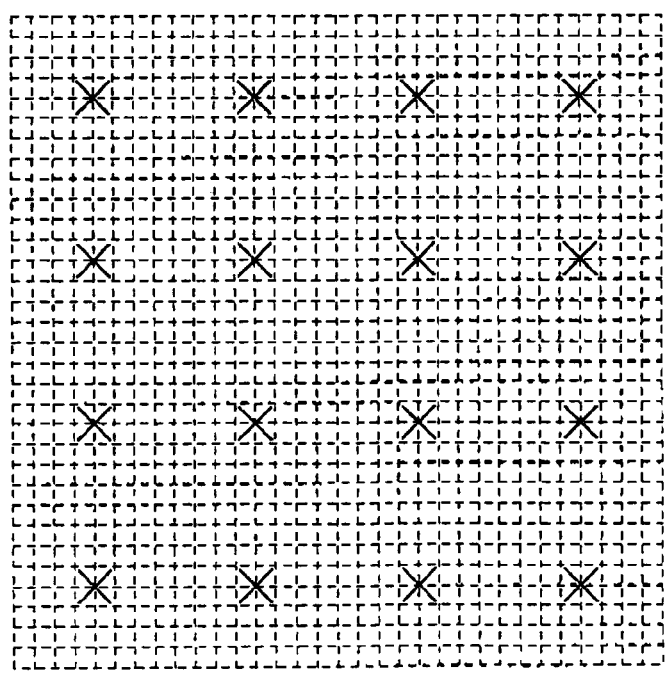
FIG. 18 presents a signal constellation diagram divided into (36×36) small regions in the fifth embodiment of the present invention.

FIG. 18 presents a signal constellation diagram divided into (36×36) small regions.

In this way, it is possible to improve accuracy of the likelihood values.

Generally, by executing operations of quadrant detection and coordinate transformation for N times, the signal constellation diagram is divided into ($2^N \times 2^N$) small regions. Then, likelihood values can be by assigned to signal points depending on distances from the center of a small region including the received-signal signal point to the signal points to rank the signal points.

Sixth Embodiment

In the above embodiments, the location of the received-signal signal point $z_3'$ on the signal constellation diagram is determined, and signal point candidates are ranked in order to likelihood. To do this, operations of quadrant detection and coordinate transformation are executed repeatedly for two or more times.

Below, another method for ranking the signal point candidates (that is, decide priority levels) is explained.

Figure 24A:
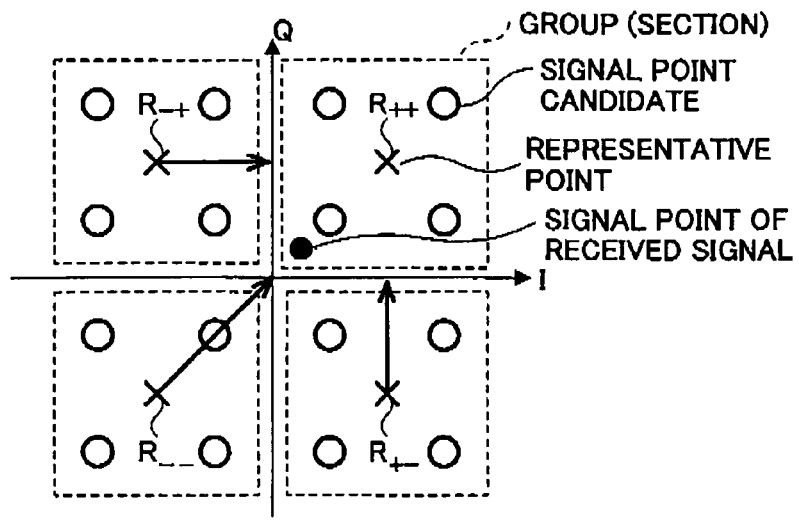
FIG. 24A through FIG. 24C present signal constellation diagrams for explaining a method of ranking signal points according to a sixth embodiment.
Figure 24B:
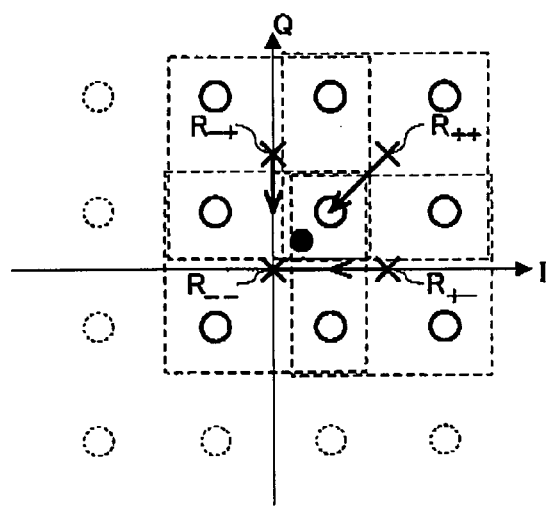
Figure 24C:
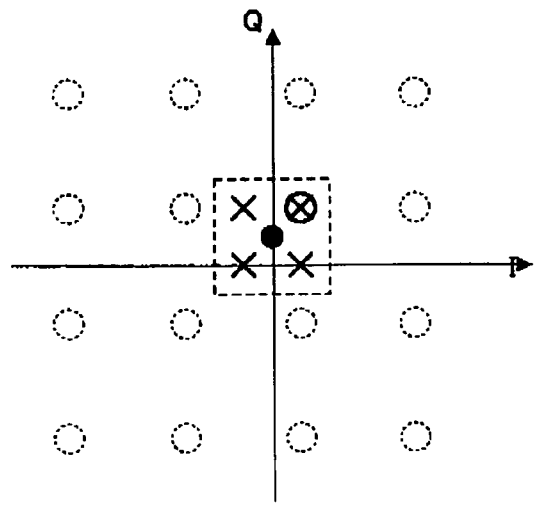

FIG. 24A through FIG. 24C present signal constellation diagrams for explaining a method of ranking signal points according to the present embodiment.

In this embodiment, it is assumed that four transmission signals are transmitted from four transmitting antennae of transmitters by using the 16 QAM modulation scheme, and a receiver separates the received signal into the four individual transmission signals.

In the present embodiment, as illustrated in FIG. 24A, in addition to 16 signal point candidates represented by open circles, four representative points $R_{++}$, $R_{-+}$, $R_{+-}$, $R_{--}$ are defined on the signal constellation diagram. The representative points are represented by crosses.

The coordinates of the 16 signal point candidates are expressed by (±a or ±3a, ±a or ±3a). Generally, the coordinates of the representative points are expressed by $R_{++}(X_1, Y_1)$, $R_{-+}(X_2, Y_2)$, $R_{+-}(X_3, Y_3)$, and $R_{--}(X_4, Y_4)$.

In the example shown in FIG. 24A, the following relation holds; $|X_1|=|X_2|=|X_3|=|X_4|=|Y_1|=|Y_2|=|Y_3|=|Y_4|$, and $X_2=-|X_1|, Y_2=-|Y_1|$.

In FIG. 24A, a received-signal signal point is represented by a solid circle, and the coordinates of the received-signal signal point are expressed by (u, v).

For example, each representative point is set at a center of a region including four signal points surrounding the representative point. But it is not required to set representative points in this way.

Figure 25:
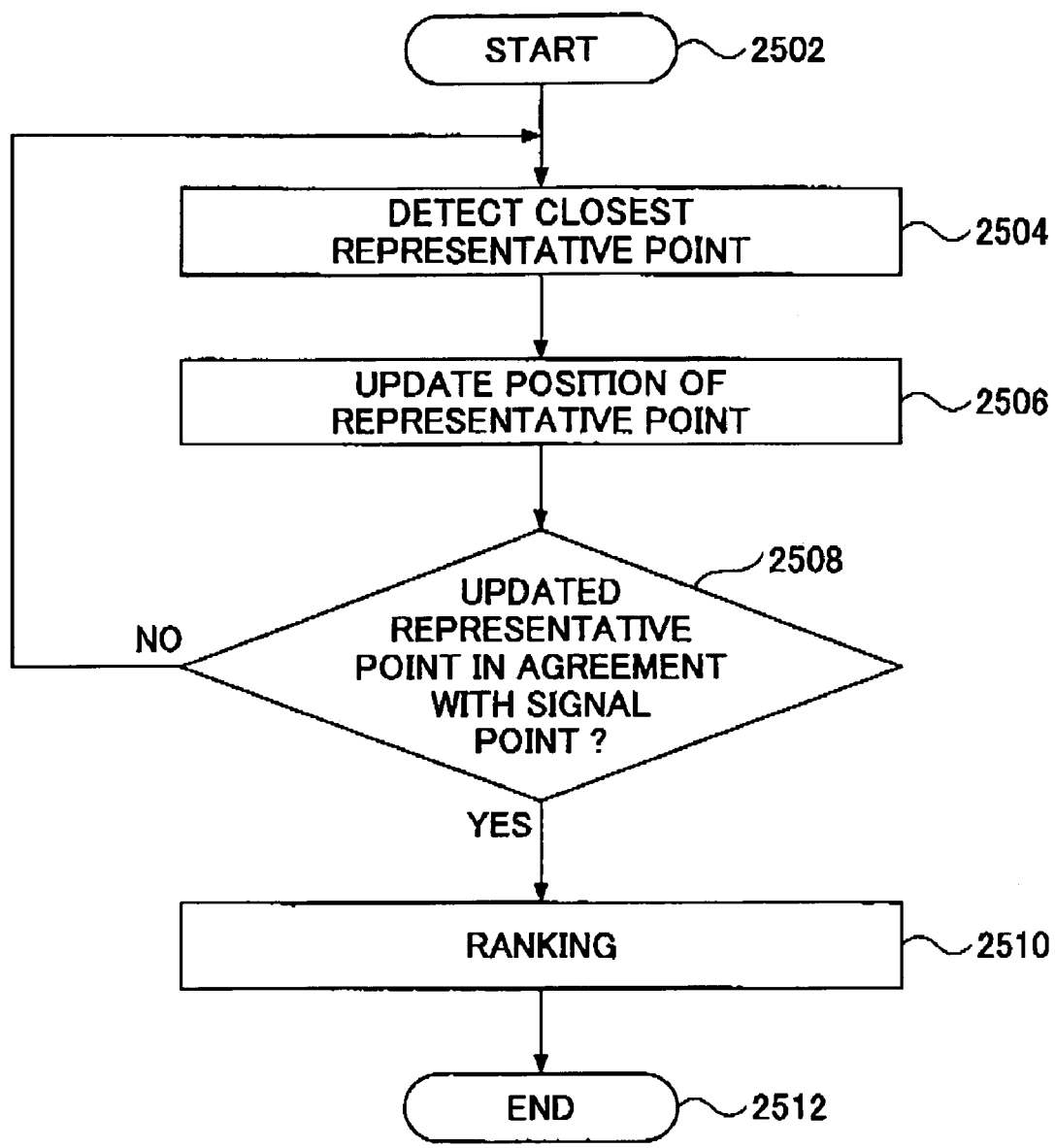
FIG. 25 is a flowchart of a method of ranking signal points according to the sixth embodiment.

FIG. 25 is a flowchart of a method of ranking signal points according to the present embodiment.

In step 2504, among the four representative points, the representative point closest to the received-signal signal point is detected. To make this detection, for example, squared Euclidian distances between the received-signal signal point and the four representative points can be calculated, and the representative point having the smallest Euclidian distance can be selected as the representative point closest to the received-signal signal point.

However, in this method, it is necessary to calculate the squared Euclidian distance four times, hence, when the number of the signal point candidates increases, the number of calculations increases greatly.

In the present embodiment, the representative point closest to the received-signal signal point is detected in the following way. That is, it is determined whether the coordinate u of the received-signal signal point along the I axis is greater than a midpoint of the I-coordinates of two representative points, and whether the coordinate v of the received-signal signal point along the Q axis is greater than a midpoint of the Q-coordinates of two representative points, then the representative point closest to the received-signal signal point is detected based on the results of the determination.

Specifically,

If $u \geq X_1-(X_1-X_2)/2$, and $v \geq Y_1-(Y_1-Y_2)/2$, the closest representative point is $R_{++}(X_1,Y_1)$.

If $u < X_1-(X_1-X_2)/2$, and $v \geq Y_1-(Y_1-Y_2)/2$, the closest representative point is $R_{-+}(X_2,Y_2)$.

If $u \geq X_3-(X_3-X_4)/2$, and $v < Y_3-(Y_3-Y_4)/2$, the closest representative point is $R_{+-}(X_3,Y_3)$.

If $u < X_3-(X_3-X_4)/2$, and $v < Y_3-(Y_3-Y_4)/2$, the closest representative point is $R_{--}(X_4,Y_4)$ Because of this determination, one group including the received-signal signal point is detected. The detected group includes the closest representative point and the signal points nearby. In the example shown in FIG. 24A, the group indicated by a dashed line in the first quadrant is detected.

In step S2506, coordinates of the representative points other than the closest representative point are updated so as to approach the closest representative point.

In the example shown in FIG. 24A, each of the three representative points other than the closest representative point is updated to be the midpoint of a segment from the representative point to the closest representative point.

In step S2508, it is determined whether the coordinates of the updated representative points are in agreement with coordinates of signal point candidates (open circles).

In the present example, the updated representative points are indicated by crosses in FIG. 24B. As illustrated in FIG. 24B, none of the updated representative points are in agreement with coordinates of signal point candidates (open circles). As a result, the routine returns to step S2504 from step S2508. Then, step S2504 and step S2506 are executed again.

This time, in step 2504, among the four representative points, the representative point closest to the received-signal signal point is detected to be $R_{--}$, as illustrated in FIG. 24B. Then, in step S2506, coordinates of the other three representative points are updated so as to approach the closest representative point. As shown in FIG. 24B and FIG. 24C, the coordinates of the updated representative point $R_{++}$ is in agreement with the coordinates (a, a) of one signal point candidate. As a result, the routine proceeds to step S2510 from step S2508.

In step S2510, the signal point candidate in agreement with one representative point is assigned the highest likelihood value, and other signal point candidates are assigned relatively low likelihood values to rank the signal points.

For example, the position relation between the signal points and the representative points, and location of the group including the received-signal signal point $z_3'$ may be taken into consideration when assigning the likelihood values.

Next, in step S2512, the routine is ended.

According to the present embodiment, it is possible to appropriately rank plural signal point candidates without moving the origin of the signal constellation diagram, and without calculating the squared Euclidian distances. In the above example, for simplicity of description, the number of the representative points is set to be a square root of the number of modulation multi-levels. But the number of modulation multi-levels, the number of the representative points, and the number of the signal point candidates in one group are not limited to these above values, and they can be any appropriate values. But in step S2506, when the representative points are updated to be the midpoints of the segments from the representative points to the closest representative point, it is required that the initial value of the minimum interval between adjacent representative points be an even integral multiple of the minimum interval between adjacent signal points (In the above example, the minimum interval between adjacent signal points is 2a). For example, instead of the above representative points, points (4a, 4a), (−4a, 4a), (4a, −4a), and (−4a, −4a) may also be selected as the representative points.

Seventh Embodiment

Figure 19:
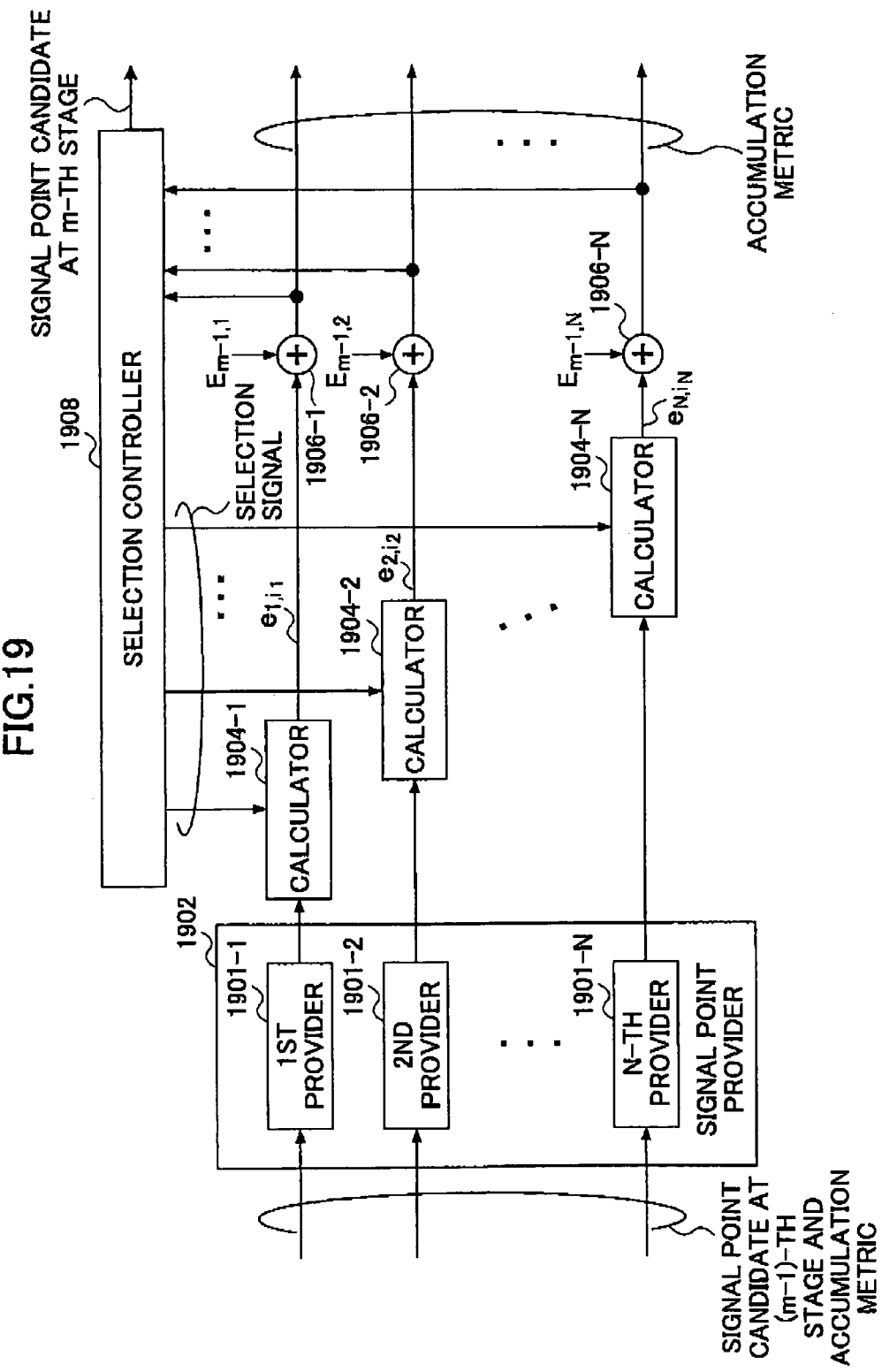
FIG. 19 is a block diagram illustrating a functional configuration of a principle portion of a signal separation device according to a seventh embodiment of the present invention.

FIG. 19 is a block diagram illustrating a functional configuration of a principle portion of a signal separation device according to the present embodiment.

The signal separation device as illustrated in FIG. 19 executes the sequence of the operations shown in FIG. 3 to separate the received signals into individual transmission signals.

Each of the components illustrated in FIG. 19 executes a stage of processing in FIG. 3, and the operations of the components are explained with reference to FIG. 20.

The signal separation device in FIG. 19 includes a signal point provider 1902, a number of calculators 1904-1 through 1904-N for calculating the squared Euclidian distances, a number of adders 1906-1 through 1906-N, and a selection controller 1908. The signal point provider 1902 includes a first provider 1901-1 through an N-th provider 1901-N.

The signal point provider 1902 receives information of the signal point candidates obtained at the preceding stage, and prepares the signal point candidates to be used in the present stage.

In the example shown in FIG. 3, N=16, in the following description, it is also assumed N=16.

The first provider 1901-1 through the N-th provider 1901-N have the same structure and the same function. Below, the first provider 1901-1 is used as an example for description.

The first provider 1901-1 receives one of the signal point candidates obtained at the preceding stage (for example, the first stage), and prepares the 16 signal point candidates (open circles in FIG. 6A) to be used in determination in the present stage (for example, the second stage). For example, one of the 16 signal point candidates is one of the 16 received-signal signal points $z_3' = r_{33}^{-1} (z_3 - r_{34} x_4)$, corresponding to the solid circle in FIG. 6A.

The first provider 1901-1 ranks the 16 signal point candidates prepared at the present stage by using any of the methods described in the first to fifth embodiments, or by any combination of these methods. That is, the first provider 1901-1 calculates likelihood levels of the 16 signal point candidates and assigns the 16 signal point candidates certain numbers representing the obtained likelihood levels, as done in FIG. 7, FIG. 9, and FIG. 17.

The second provider 1901-2 through the N-th provider 1901-N prepare received-signal signal points $z_3'$ related to other candidates of the fourth transmission signal $x_4$, and rank the 16 signal point candidates related to the received-signal signal points $z_3'$.

The calculators 1904-1 through 1904-N, in response to a selection signal from the selection controller 1908, calculate squared Euclidian distances $e_{x,ix}$ (x=1, ..., N) between each of the signal points output from the first provider 1901-1 through the N-th provider 1901-N and the received-signal signal point.

The adders 1906-1 through 1906-N add the squared Euclidian distances $E_{m-1,1}$ to $E_{m-1,N}$ obtained by calculations at the preceding stage with the respective squared Euclidian distances $e_{x,ix}$ obtained by calculations at the present stage, and output the accumulated squared Euclidian distances (accumulative metric).

The selection controller 1908 primarily controls operations of the calculators 1904-1 through 1904-N. The selection controller 1908 selects one signal point from all of the signal point candidates (a total of 256 in the signal point provider 1902) according to the rankings of the signal point candidates assigned by using any of the methods described in the first to fifth embodiment, or by any combination of these methods, and based on a certain criterion, outputs a selection signal to a calculator 1904-x, which outputs the selected signal point.

Upon receiving the selection signal, the calculator 1904-x calculates the squared Euclidian distance between the signal point and the received-signal signal point.

It should be noted that the calculators other than the calculator 1904-x, which receives the selection signal, do not calculate the squared Euclidian distances at all; even for the selected calculator 1904-x, it only calculates the squared Euclidian distance between the selected signal point and the received-signal signal point.

The squared Euclidian distance obtained by calculations is used for updating a quantity representing the aforesaid determination criterion. While considering the updated determination criterion, the selection controller 1908 selects one more signal point from the unselected signal point candidates, and outputs a selection signal.

This routine is repeatedly executed, until 16 signal point candidates are obtained.

Figure 20:
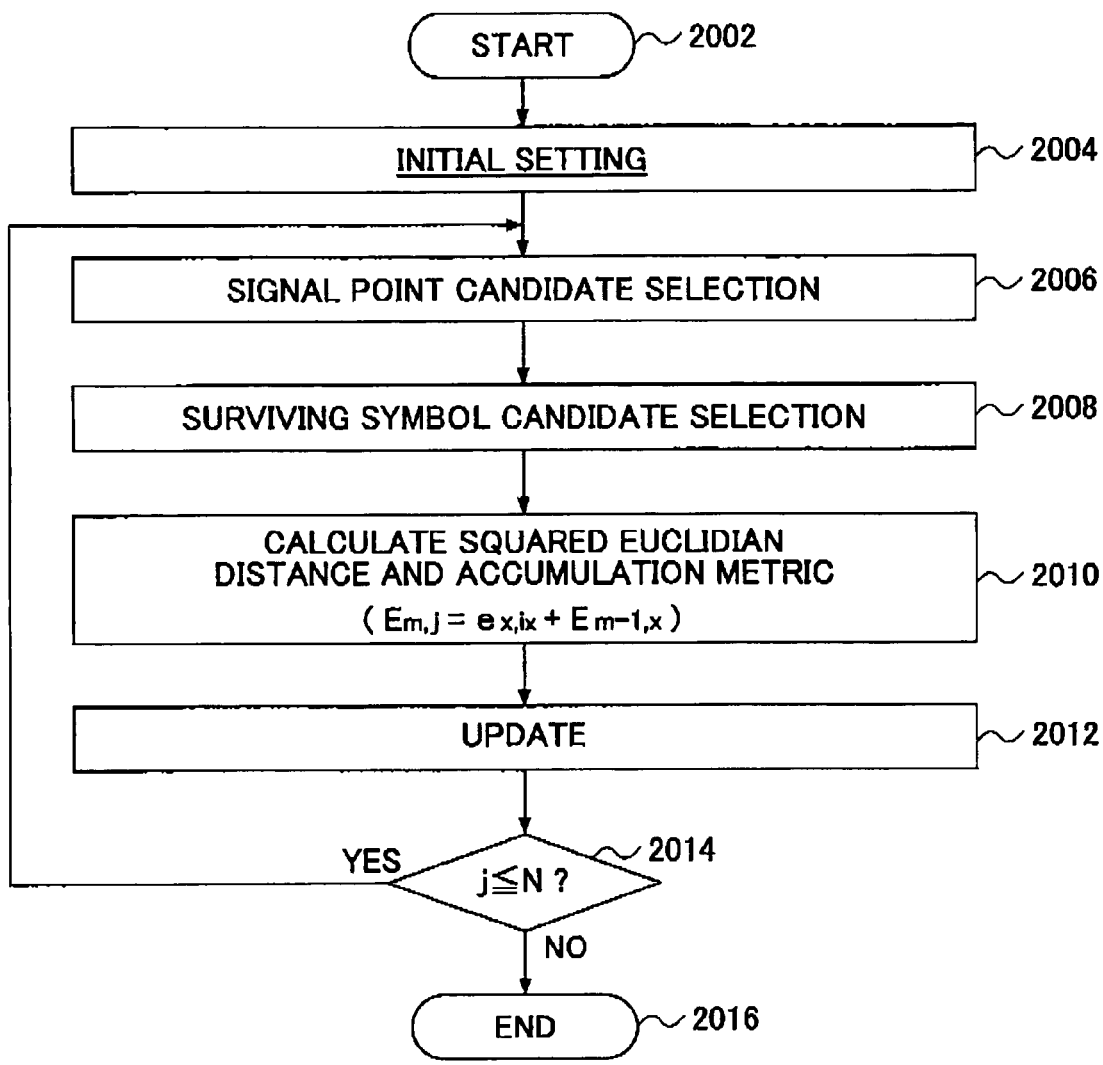
FIG. 20 is a flowchart of the operations of the signal separation device according to the seventh embodiment of the present invention.

FIG. 20 is flowchart of operations of the signal separation device according to the seventh embodiment.

The procedure shown in FIG. 20 is executed in the first, second, and the subsequent stages shown in FIG. 3. Below, these stages are identified by an index m.

In step 2004, parameters used for calculations are initialized.

A parameter j ($1 \leq j \leq N=16$) serves as a counter for distinguishing the 16 signal point candidates output at the present stage. The parameter j is initialized to be 1 (j=1).

$E_{m-1,1}$ to $E_{m-1,N}$ represent the accumulated squared Euclidian distances (or accumulative metrics) obtained by calculations at the (m−1)-th stage (the preceding stage), and each of $E_{m-1,1}$ to $E_{m-1,N}$ is also referred to as an "accumulation branch metric". Maximum accumulation branch metrics $M_{m-1,1}$ to $M_{m-1,N}$ are used as comparison criteria, as described below. Maximum accumulation branch metrics $M_{m-1,1}$ to $M_{m-1,N}$ are initialized to be respective accumulation branch metrics $E_{m-1,1}$ to $E_{m-1,N}$ at the preceding stage. That is, $M_{m-1,1}=E_{m-1,1}, \ldots, M_{m-1,N}=E_{m-1,N}$. The maximum accumulation branch metrics $M_{m-1,1}$ to $M_{m-1,N}$ are updated (incremented) when the signal point candidates output to the next state are decided (these signal point candidates are the surviving symbol candidates). For example, $M_{m-1,1}$ is incremented from the initial value $E_{m-1,1}$ to be $E_{m-1,1}+e_{1,1}$, $E_{m-1,1}+e_{1,2}$, $E_{m-1,1}+e_{1,3}, \ldots$, sequentially. The ranking numbers $i_1$ to $i_N$ express an order or likelihood levels of the 16 signal point candidates in the first provider 1901-1, and all of them are initialized to be 1.

In step 2006, 16 maximum accumulation branch metrics $M_{m,1}$ to $M_{m,N}$ are compared with each other, and the minimum one ($M_{m,x}$) among them is selected. Here, the index "x" indicates the number of the above selected signal point candidate among the signal point candidates selected at the preceding stage (that is, the surviving symbol candidates). The signal point candidates related to the maximum accumulation branch metric $M_{m,x}$ are provided from the x-th provider 1901-x.

In step 2008, among the signal point candidates related to the maximum accumulation branch metric $M_{m,x}$, a signal point candidate having a ranking number of $i_x$ is selected as the j-th signal point candidate at the present stage (m-th stage), where $i_x=1, 2, \ldots, 16$, and $x=1, 2, \ldots, 16$.

In step 2010, the squared Euclidian distance ($e_{x,ix}$) relative to the selected signal point candidate is calculated. The accumulation branch metrics $E_{m,j}$ is calculated by $E_{m,j}=E_{m-1,x}+e_{x,ix}$.

In step 2012, all of the parameters are updated. The maximum accumulation branch metric $M_{m,x}$ is updated to be $E_{m,j}$. The ranking number $i_x$ is incremented by one, and the count j is also incremented by one.

It is determined whether the count j is less than or equal to N, which is the maximum of j. If j is less than or equal to N, the routine returns to step 2006 and the same procedure is repeatedly executed. If j is greater than N, the routine proceeds to step 2016, and the flow is finished.

When processing in one stage is completed, processing in the next stage is performed, as shown in FIG. 3. When processing in the last stage is finished, the processing in step S354 is executed, that is, the received signal is separated into individual transmission signals. In the operations of signal separation, the accumulation metrics of the 16 signal point candidates, that is, the surviving symbol candidates, are compared with each other, and the signal point having the minimum accumulation metric (accumulation of the squared Euclidian distance) is determined to be in correspondence with the received-signal signal point.

In this way, the mapping relations between the four transmission signals ($x_1, x_2, x_3,$ and $x_4$) and the respective symbols are made clear, then modulation is performed.

Theoretically, it is possible to select the signal point candidates output to the later stage without using the accumulation, but based only on the squared Euclidian distances $e_{x,ix}$ obtained at each stage. However, from the point of view of improving reliability of signal separation, it is preferable to calculate the accumulation of the squared Euclidian distances $e_{x,ix}$ obtained at every stage, as described in the present embodiment. When complicated multiple antennae are used in the MIMO, SIMO, or MISO systems, different channels have different fading characteristics. When selecting signal point candidates of a certain stage, by considering the squared Euclidian distances at earlier stages, it is possible to benefit from a diversity effect due to such independent fading characteristics.

Figure 21:
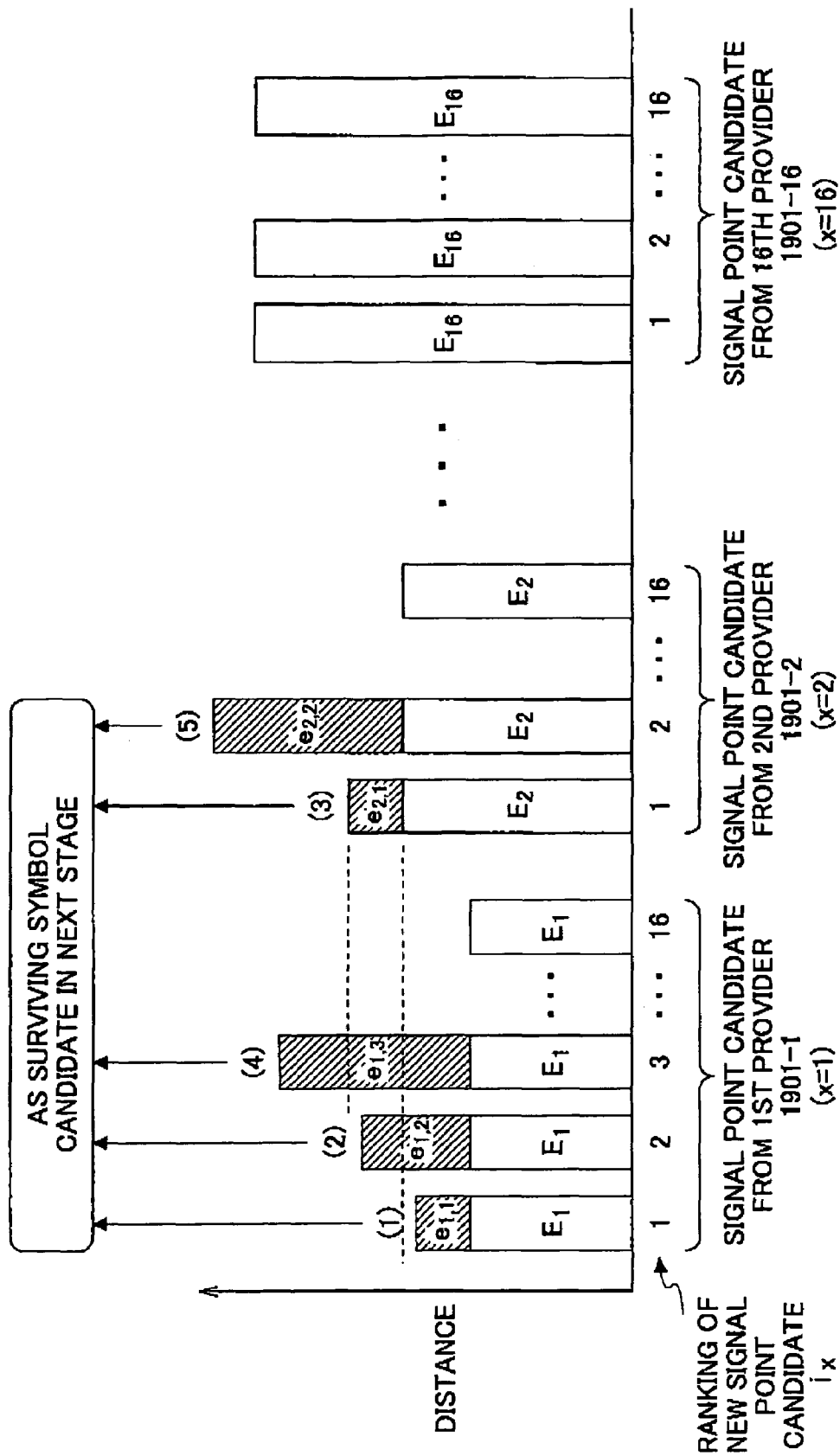
FIG. 21 is a diagram illustrating the operations of the signal separation device according to the seventh embodiment.

FIG. 21 is a diagram illustrating the operations of the signal separation device according to the present embodiment described by the flowchart in FIG. 20 with j=1 to 5. Specifically, FIG. 21 shows operations of extracting 5 signal point candidates from the 256 signal point candidates prepared in the signal point provider 1902 in FIG. 19.

First, when j=1, assuming x=1. in this case, among the signal point candidates prepared by the first provider 1901-1, the signal point candidate specified by a ranking number of $i_1=1$ (initial value) is selected. In the present embodiment, because the ranking number is in order from high probability, the first signal point candidate is selected. Then, the squared Euclidian distance $e_{1,1}$ related to the selected signal point candidate is calculated, and the squared Euclidian distance $e_{1,1}$ is added to an accumulation value $E_1$ obtained at the preceding stage. It should be noted that, to be exact, the accumulation value should be $E_{m-1,1}$, but for simplicity of description, the subscript m−1 is omitted. Then, the maximum accumulation branch metric $M_{m,1}$ is updated from $E_{m-1,1}$ to $E_{m-1,1}+e_{1,1}$. The ranking number $i_1$ is incremented by one ($i_1=2$)

In this way, one signal point candidate to be output to the later stage (that is, the surviving symbol candidate) is selected.

Next, when j=2, in step S2006, the updated $M_{m,1}$ and other maximum accumulation branch metrics ($M_{m,2}$ to $M_{m,N}$) are compared with each other. This time, assume $M_{m,1}$ becomes the minimum again. That is, x=1. In this case, among the signal point candidates prepared by the first provider 1901-1, the signal point candidate specified by the ranking number of $i_1=2$ is selected. Then, the squared Euclidian distance $e_{1,2}$ related to the selected signal point candidate is calculated, and the squared Euclidian distance $e_{1,2}$ is added to the accumulation value $E_1$ obtained at the preceding stage. Then, the maximum accumulation branch metric $M_{m,1}$ is updated from $E_{m-1,1}+e_{1,1}$ to $E_{m-1,1}+e_{1,2}$. The ranking number $i_1$ is incremented by one ($i_1=3$).

Next, when j=3, in step S2006, the updated $M_{m,1}$ and other maximum accumulation branch metrics ($M_{m,2}$ to $M_{m,N}$) are compared with each other. This time, assume $M_{m,2}$ is the minimum. That is, x=2. In this case, among the signal point candidates prepared by the second provider 1901-2, the signal point candidate specified by a ranking number of $i_2=1$ (initial value) is selected. Then, the squared Euclidian distance $e_{2,1}$ related to the selected signal point candidate is calculated, and the squared Euclidian distance $e_{2,1}$ is added to the accumulation value $E_2$ obtained at the preceding stage. Then, the maximum accumulation branch metric $M_{m,2}$ is updated from $E_{m-1,2}$ to $E_{m-1,2}+e_{2,1}$. The ranking number $i_2$ is incremented by one ($i_2=2$).

Next, when j=4, in step S2006, the updated $M_{m,1}$, $M_{m,2}$ and other maximum accumulation branch metrics ($M_{m,3}$ to $M_{m,N}$) are compared with each other. This time, assume $M_{m,1}$ becomes the minimum. That is, x=1. In this case, among the signal point candidates prepared by the first provider 1901-1, the signal point candidate specified by the ranking number of $i_1$=3 is selected. Then, the squared Euclidian distance $e_{1,3}$ related to the selected signal point candidate is calculated, and the squared Euclidian distance $e_{1,3}$ is added to the accumulation value $E_1$ obtained at the preceding stage. Then, the maximum accumulation branch metric $M_{m,1}$ is updated from $E_{m-1,1}+e_{1,2}$ to $E_{m-1,1}+e_{1,3}$. The ranking number $i_1$ is incremented by one ($i_1$=4).

Next, when j=5, in step S2006, the updated $M_{m,1}$, $M_{m,2}$ and other maximum accumulation branch metrics ($M_{m,3}$ to $M_{m,N}$) are compared with each other. This time, assume $M_{m,2}$ is the minimum. That is, x=2. In this case, among the signal point candidates prepared by the second provider 1901-2, the signal point candidate specified by a ranking number of $i_2$=2 is selected. Then, the squared Euclidian distance $e_{2,2}$ related to the selected signal point candidate is calculated, and the squared Euclidian distance $e_{2,2}$ is added to an accumulation value $E_2$ obtained at the preceding stage. Then, the maximum accumulation branch metric $M_{m,2}$ is updated from $E_{m-1,2}+e_{2,1}$ to $E_{m-1,2}+e_{2,2}$. The ranking number $i_2$ is incremented by one ($i_2$=3).

In this way, five signal point candidates and accumulation branch metrics are calculated. In practice, the above processing is repeatedly executed until 16 signal point candidates are selected.

Figures 22, 23:
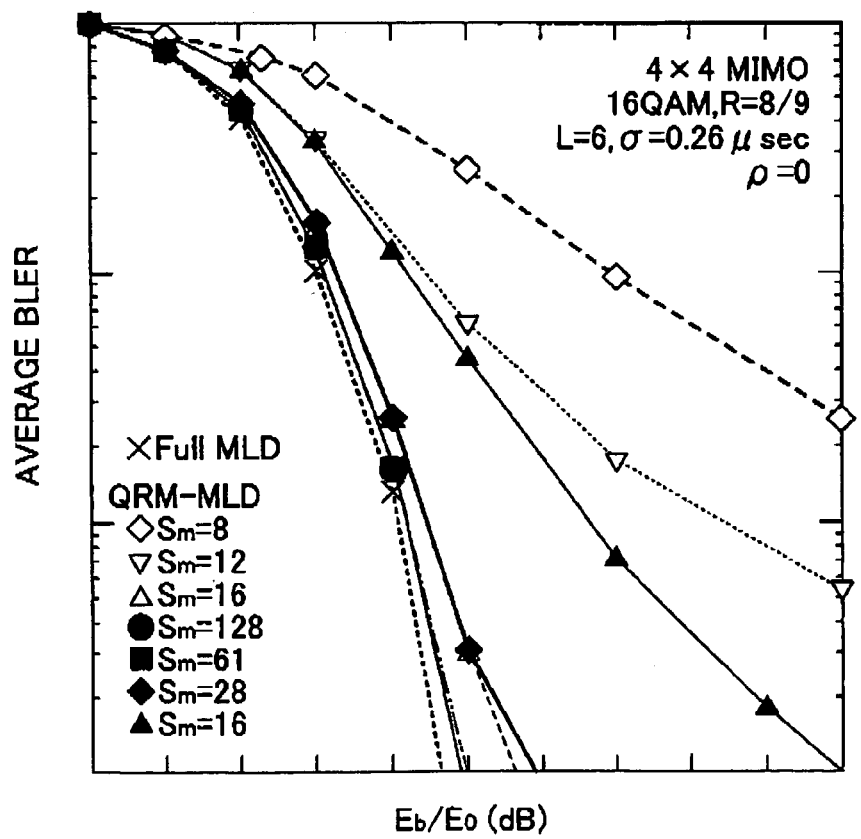
FIG. 22 is a table showing numbers of calculations of the squared Euclidian distance by the MLD, the QRM-MLD of the related art, and the QRM-MLD of the seventh embodiment.
FIG. 23 shows simulation results in the seventh embodiment.

FIG. 22 is a table showing numbers of calculations when calculating the squared Euclidian distance by the MLD, the QRM-MLD of the related art, and the QRM-MLD of the present embodiment.

In examples shown in FIG. 22, it is assumed that four transmission signals are transmitted from four transmitting antennae by using the 16 QAM modulation scheme, and a receiver separates signals by means of MLD.

In the table shown in FIG. 22, the full MLD, the QRM-MLD of the related art, and the QRM-MLD of the present embodiment are compared with each other. In FIG. 22, a symbol Sm indicates the number of signal point candidates to be output from one stage to the next stage, and values of Sm of the above three methods are compared. In the above example of the present embodiment, Sm is set to be 16.

Simulations are made to investigate the numbers of calculations to deduce the squared Euclidian distance with the number of signal point candidates (Sm) taking various values.

In the full MLD, there are 16 possible signal points for each of the four transmission signals, the squared Euclidian distances are calculated for all 256 combinations of these signal points, and thus the total number of calculations amounts to $16^4$=65536.

In the QRM-MLD of the related art, in each stage, a number of Sm signal point candidates are selected from all 256 (16×Sm) combinations. At the first stage, there are only 16 combinations. Therefore, when Sm=16, the total number of calculations equals 16 (first stage)+16 (number of signal point candidates from preceding stage)×16 (number of newly introduced signal point candidates)×3 (three stages)=784. When Sm=12, the total number of calculations equals 16+12×16×3=592. When Sm=8, the total number of calculations equals 16+8×16×3=400.

In the QRM-MLD of the present embodiment, in each stage, the squared Euclidian distances are calculated for a number of times the same as the number of signal point candidates output in each stage. Therefore, when Sm=128 (the number of signal point candidates selected in the present stage), the total number of calculating the squared Euclidian distance equals 16 (first stage)+128 (number of signal point candidates selected at the present stage)×1 (selecting one from 16 signal point candidates)×3 (three stages)=400.

It is found that even though the Sm is eight multiples of 16 in the present embodiment, the number of times calculating the squared Euclidian distance equals approximately half of that in the QRM-MLD of the related art.

When Sm=61, the total number of times calculating the squared Euclidian distance equals 16+61×1×3=199. When Sm=28, the total number of times calculating the squared Euclidian distance equals 16 equals 16+28×1×3=100. When Sm=16, the total number of calculations equals 16+16×1×3=64, only one-16th of the QRM-MLD of the related art. Hence, according to the present embodiment, it is possible to greatly reduce the number of calculations in signal separation process including calculations of the squared Euclidian distance.

FIG. 23 shows simulation results in the present embodiment.

The following are the conditions used in the simulation shown in FIG. 23.

Number of transmitting antennae: 4
Number of receiving antennae: 4
Modulation scheme: 16 QAM
Turbo Coding rate R: 8/9
Presumed number of multi-path numbers L: 6
Delay spread σ: 0.26 μsec
Correlation between transmitting antennae and receiving antennae ρ: 0

In FIG. 23, the abscissa represents an average of the ratio of signal power to noise power per data bit for one receiving antenna, denoted to be $Eb/N_0$. The ordinate represents the average block error rate (BLER). In FIG. 23, the simulation results by the full MLD are indicated by crosses, which show limiting values; the simulation results by the QRM-MLD of the related art are indicated by open upward triangles (Sm=16), open downward triangles (Sm=12), and open diamonds (Sm=8), respectively; the simulation results by the QRM-MLD of the present embodiment are indicated by solid circles (Sm=128), solid squares (Sm=61), solid diamonds (Sm=28), and solid triangles (Sm=16) respectively.

As shown in FIG. 23, the simulation results of the present embodiment with Sm=128 or 61 are very close to the simulation results by the full MLD.

With Sm=16, in the simulation of the present embodiment, the block error rate is greater than that of the full MLD. However, as shown in FIG. 23, the simulation results of the present embodiment are better than those of the related art with Sm=12 (open downward triangles) or Sm=8 (open diamonds), and more important, in the simulation of the present embodiment with Sm=16, the number of times calculating the squared Euclidian distance is only 64. In contrast, in the related art with Sm=12 (open downward triangles) and Sm=8 (open diamonds), the numbers of times calculating the squared Euclidian distance are 592 and 400, respectively.

According to the present embodiment, it is possible to maintain the precision of signal separation while greatly reducing the number of times calculating the squared Euclidian distance, thus reducing total number of calculations and improving calculation efficiency.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, it is described that the present invention is applied to communication systems adopting the MIMO scheme and 16QAM modulation scheme. The present invention is not limited to this system, but widely applicable to signal separation devices and methods utilizing QRM-MLD.

Specifically, the present invention is applicable to not only MIMO but also SIMO, MISO, and SISO. The modulation scheme is not limited to 16QAM, either, but applicable to QPSK, 64 QAM, and other multi-level modulation schemes.

In the above embodiments, it is described that the signal point distribution diagram is presented in a Cartesian coordinate system, but the signal point distribution diagram can be presented in other coordinate systems, such as a polar coordinate system. Specifically, the signal point distribution diagram and the quadrants can be presented in the polar coordinate system.

This patent application is based on Japanese Priority Patent Application No. 2004-144182 filed on May 13, 2004, the entire contents of which are hereby incorporated by reference.

What is claimed is:

1. A signal separation device that receives a plurality of signals transmitted from a plurality of transmission devices and separates the received signals into the individual transmission signals, said signal separation device comprising:
   a signal point derivation unit configured to multiply the received signals with respective elements of a unitary matrix, and derive at least one received-signal signal point on a signal point distribution diagram, different signals being related to different signal points at different positions on said signal point distribution diagram, said received-signal signal point being a signal point corresponding to one of the received signals;
   a definition unit configured to define a plurality of sections on the signal point distribution diagram, each of the sections including a first predetermined number of the signal points, the definition unit being further configured to define a plurality of sub-sections in a received-signal section, each of the sub-sections including a second predetermined number of signal points, the received-signal section being a quadrant of the signal point distribution diagram;
   a detection unit configured to detect the received-signal section from said sections, said received-signal section including the received-signal signal point, the detection unit being further configured to detect a received-signal sub-section from the plurality of sub-sections on the received-signal section, the received-signal sub-section including the received-signal signal point and being a quadrant of the signal point distribution diagram having an origin at the received-signal section;
   a selection unit configured to select the signal points in the received-signal section as candidates of the received-signal signal point, the selection unit being further configured to select at least the signal points included in the received-signal sub-section as candidates of the received-signal signal point; and
   a determination unit configured to determine the transmission signals based on the selected signal points,
   wherein the origin of the signal point distribution diagram is set at one of the signal points, the quadrant corresponding to the received-signal section is detected, the origin of the signal point distribution diagram is moved into the quadrant corresponding to the received-signal section, and the quadrant corresponding to the received-signal sub-section is detected.

2. The signal separation device as claimed in claim 1, further comprising:
   a ranking unit configured to determine priority levels of plural of the signal points.

3. The signal separation device as claimed in claim 1, further comprising:
   a calculation unit configured to calculate a quantity representing a Euclidian distance between each of the candidates of the received-signal signal point and the received-signal signal point.

4. The signal separation device as claimed in claim 3, wherein the quantity representing the Euclidian distance includes a portion of a Euclidian distance related to another received-signal signal point deduced previously.

5. A signal separation method causing a signal separation device to receive a plurality of signals transmitted from a plurality of transmission devices and to separate the received signals into the individual transmission signals, said signal separation method comprising:
   multiplying, in a signal point derivation unit, the received signals with respective elements of a unitary matrix, and deriving at least one received-signal signal point on a signal point distribution diagram, different signals being related to different signal points at different positions on said signal point distribution diagram, said received-signal signal point being a signal point corresponding to one of the received signals;
   defining, in a definition unit, a plurality of sections on the signal point distribution diagram, each of the sections including a predetermined number of the signal points;
   defining, in the definition unit, a plurality of sub-sections in a received-signal section, each of the sub-sections including a second predetermined number of signal points, the received-signal section being a quadrant of the signal point distribution diagram, the received-signal sub-section being a quadrant of the signal point distribution diagram having an origin located in the received-signal section;
   detecting, in a detection unit, a received-signal section from said sections, said received-signal section including the received-signal signal point;
   detecting, in the detection unit, a received-signal sub-section from the plural sub-sections on the received-signal section, said received-signal sub-section including the received-signal signal point;
   selecting, in a selection unit, the signal points in the received-signal section as candidates of the received-signal signal point;
   selecting, in the selection unit, at least the signal points included in the received-signal sub-section as candidates of the received-signal signal point;
   setting, in the signal point derivation unit, the origin of the signal point distribution diagram to one of the signal points;
   detecting, in the detection unit, the quadrant corresponding to the received-signal section;
   moving, in the signal point derivation unit, the origin of the signal point distribution diagram into the quadrant corresponding to the received-signal section; and
   detecting, in the detection unit, the quadrant corresponding to the received-signal sub-section.

6. The signal separation method as claimed in claim 5, wherein the defining of the plurality of sub-sections, the detecting of the received-signal sub-section, and the selecting of the at least signal points included in the received-signal sub-section are repeatedly executed until the received-signal sub-section includes only one candidate of the received-signal signal point.

7. The signal separation method as claimed in claim 5, wherein the moving of the origin of the signal point distribution diagram into the quadrant corresponding to the received-signal section and the detecting of the quadrant corresponding to the received-signal sub-section are repeatedly executed.

8. The signal separation method as claimed in claim 5, further comprising:

calculating a quantity representing a Euclidian distance between each of the candidates of the received-signal signal point and the received-signal signal point.

9. The signal separation method as claimed in claim 8, wherein the quantity representing the Euclidian distance includes a portion of a Euclidian distance related to another received-signal signal point deduced previously.

10. The signal separation method as claimed in claim 5, further comprising:

determining priority levels of plural of the signal points.

* * * * *